(12) United States Patent
Matsueda et al.

(10) Patent No.: US 12,203,044 B2
(45) Date of Patent: *Jan. 21, 2025

(54) PARTICLE-CONTAINING GREASE COMPOSITION

(71) Applicant: DIC Corporation, Tokyo (JP)

(72) Inventors: Hironobu Matsueda, Kamisu (JP); Yusuke Kano, Sakura (JP); Akihiro Koike, Sakura (JP); Jianjun Yuan, Sakura (JP)

(73) Assignee: DIC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/282,058

(22) PCT Filed: Mar. 22, 2022

(86) PCT No.: PCT/JP2022/012983
§ 371 (c)(1),
(2) Date: Sep. 14, 2023

(87) PCT Pub. No.: WO2022/202751
PCT Pub. Date: Sep. 29, 2022

(65) Prior Publication Data
US 2024/0158715 A1   May 16, 2024

(30) Foreign Application Priority Data
Mar. 24, 2021   (JP) ................. 2021-050498

(51) Int. Cl.
*C10M 125/22* (2006.01)
*C10M 169/06* (2006.01)
(Continued)

(52) U.S. Cl.
CPC ........ *C10M 125/22* (2013.01); *C10M 169/06* (2013.01); *C10M 2201/066* (2013.01);
(Continued)

(58) Field of Classification Search
CPC .............. C10M 125/22; C10M 169/06; C10M 2201/066; C10N 2010/02; C10N 2010/12;
(Continued)

(56) References Cited

U.S. PATENT DOCUMENTS 4,828,729 A * 5/1989 Centers ................ C10M 113/10
508/169
5,015,401 A * 5/1991 Landry ................ C10M 125/22
175/227

(Continued)

FOREIGN PATENT DOCUMENTS

CN   101100624 A   1/2008
CN   106867630 A   6/2017
(Continued)

*Primary Examiner* — Ellen M McAvoy
(74) *Attorney, Agent, or Firm* — Locke Lord LLP; James E. Armstrong, IV; Nicholas J. DiCeglie, Jr.

(57) ABSTRACT

Provided is a particle-containing grease composition that can efficiently improve friction and wear resistance properties with a small added amount and exhibits excellent friction and wear resistance properties even when a clearance and the surface roughness of the friction surface in sliding parts are extremely small. The particle-containing grease composition includes base oil, a thickener, and molybdenum disulfide particles, in which a median diameter $D_{50}$ of the molybdenum disulfide particles determined by a dynamic light scattering method is 10 nm or more and less than 450 nm.

7 Claims, 8 Drawing Sheets

(51) Int. Cl.
    *C10N 10/02*     (2006.01)
    *C10N 10/12*     (2006.01)
    *C10N 20/06*     (2006.01)
    *C10N 30/06*     (2006.01)
    *C10N 50/10*     (2006.01)

(52) U.S. Cl.
    CPC ...... *C10N 2010/02* (2013.01); *C10N 2010/12* (2013.01); *C10N 2020/06* (2013.01); *C10N 2030/06* (2013.01); *C10N 2050/10* (2013.01)

(58) Field of Classification Search
    CPC ............ C10N 2020/06; C10N 2030/06; C10N 2050/10; C01G 39/06
    See application file for complete search history.

(56) References Cited

U.S. PATENT DOCUMENTS

| | | | | |
|---|---|---|---|---|
| 11,718,809 | B2 * | 8/2023 | Kano | ..................... C01G 39/06 508/167 |
| 2007/0254817 | A1 | 11/2007 | Griffo et al. | |
| 2014/0371119 | A1 | 12/2014 | Mosleh | |
| 2021/0053037 | A1 | 2/2021 | Otsu et al. | |
| 2022/0275302 | A1 * | 9/2022 | E | .......................... C10M 169/00 |
| 2022/0290068 | A1 * | 9/2022 | E | .......................... C10M 135/18 |
| 2022/0348476 | A1 * | 11/2022 | Oki | .......................... B01J 35/23 |
| 2022/0364012 | A1 * | 11/2022 | E | .......................... C10M 117/02 |
| 2024/0158714 | A1 * | 5/2024 | Koike | ................. C10M 141/12 |
| 2024/0174834 | A1 * | 5/2024 | Koike | .................... C01G 39/06 |

FOREIGN PATENT DOCUMENTS

| | | |
|---|---|---|
| CN | 111560283 A | 8/2020 |
| JP | H08-165488 A | 6/1996 |
| JP | 2003-301188 A | 10/2003 |
| JP | 2006-16481 A | 1/2006 |
| JP | 2006-298963 A | 11/2006 |
| JP | 2007-138110 A | 6/2007 |
| JP | 2008-163201 A | 7/2008 |
| JP | 2008-231293 A | 10/2008 |
| JP | 2010-90243 A | 4/2010 |
| JP | 2014-518927 A | 8/2014 |
| JP | 2014-518932 A | 8/2014 |
| WO | 2019/181723 A1 | 9/2019 |

\* cited by examiner (1) LENGTH: 180nm
(2) WIDTH: 80nm (3) HEIGHT: 16nm

PARTICLE-CONTAINING GREASE COMPOSITION

TECHNICAL FIELD

The present invention relates to a particle-containing grease composition, and in particular relates to a particle-containing grease composition containing molybdenum sulfide.

The present application claims priority based on Japanese Patent Application No. 2021-050498 filed in Japan on Mar. 24, 2021, and the content thereof is incorporated herein.

BACKGROUND ART

Molybdenum disulfide has been known as a lubricant for reduction in friction and wear and is used in various countries. In practice, molybdenum disulfide is used by blending in lubricant oil (long-chain aliphatic low-polarity solvent-based), coating paint (low boiling point polar solvent), grease (a product in which a thickener such as Li soap is added to long-chain aliphatic low-polarity solvent), and the like.

As conventional particle-containing grease compositions, for example, a grease composition for constant velocity joints including base oil, a diurea-based thickener, molybdenum disulfide, molybdenum dialkyl dithiocarbamate sulfide, a calcium salt of petroleum sulfonic acid, a sulfur extreme pressure agent, and at least one vegetable oil selected from the group consisting of castor oil and rapeseed oil and further containing zinc dialkyl dithiocarbamate as an additive has been developed (PTL 1).

In addition, a lubricant composition that contains 10% by mass to 99.9% by mass of liquid base oil, 0.1% by mass to 90% by mass of an amide compound, and 1.0% by mass to 20% by mass of a solid lubricant or an organomolybdenum compound containing molybdenum (Mo) in an amount of 0.0005% by mass to 5% by mass and is semi-solid at room temperature has been developed (PTL 2).

In addition, a grease composition for constant velocity joints containing base oil containing 10% to 95% of ester-based synthetic oil produced from aliphatic alcohol and aromatic carboxylic acid and 90% to 5% of synthetic hydrocarbon oil, a thickener, molybdenum disulfide, molybdenum dialkyl dithiocarbamate sulfide, and zinc dithiophosphate (PTL 3), and a grease composition for constant velocity joints containing a diurea-based thickener, ester-based synthetic oil, mineral oil and/or synthetic hydrocarbon oil, molybdenum dialkyl dithiocarbamate, molybdenum disulfide, polytetrafluoroethylene, and zinc dithiophosphate compound (PTL 4) have been developed.

In addition, grease for constant velocity joints containing alkali metal salt of molybdic acid and a layered compound as essential components in base grease formed of base oil into which a thickener is blended (PTL 5), lubricant grease to which molybdenum disulfide as a solid lubricant for adjusting a density is added (PTL 6), and a method of use by adding a composition in which 0.1% by mass to 40% by mass of surface-modified nanoparticles and 99.9% by mass to 60% by mass of a carrier material are contained and the surface modification includes thiol groups to grease (PTL 7) have been developed.

As a particle-containing grease composition in which a particle diameter of molybdenum disulfide is specified, a grease composition for constant velocity joints containing base oil, a diurea-based thickener, molybdenum dialkyl dithiocarbamate that is insoluble in the base oil, molybdenum dialkyl dithiocarbamate that is soluble in the base oil, molybdenum disulfide, calcium phenate or calcium sulfonate, and a sulfur-based extreme pressure additive containing no phosphorus component, in which the particle diameter of the above molybdenum disulfide particles is 0.45 μm in Example has been disclosed (PTL 8).

CITATION LIST

Patent Literature

PTL 1: JP-A-2010-90243
PTL 2: JP-A-2008-231293
PTL 3: JP-A-2008-163201
PTL 4: JP-A-2007-138110
PTL 5: JP-A-2006-298963
PTL 6: JP-A-2003-301188
PTL 7: JP-T-2014-518932
PTL 8: JP-A-2006-16481

SUMMARY OF INVENTION

Technical Problem

However, the above commercially available molybdenum disulfide particles added to the conventional grease compositions are made by grinding natural molybdenum disulfide minerals, have a submicron order or larger size, and have a very high specific gravity of about 5. Therefore, these grease compositions have a problem of a low effect for friction and wear resistance properties with respect to a unit weight to be added. In recent years, due to technological innovation, the surface roughness of friction surfaces in sliding parts has become extremely small, and the above commercial molybdenum disulfide particles are unable to penetrate into very fine recesses in the friction surfaces, resulting in insufficient expression of the above effect. Furthermore, there has been no knowledge of the relationship between the crystal structure of molybdenum disulfide particles and friction and wear resistance properties in a grease-containing system.

An object of the present invention is to provide a particle-containing grease composition that can efficiently improve friction and wear resistance properties with a small added amount and exhibits excellent friction and wear resistance properties even when a clearance and the surface roughness of the friction surface in sliding parts are extremely small.

Solution to Problem

As a result of intensive studies, the inventors of the present invention have found that when molybdenum disulfide particles having a specified median diameter $D_{50}$ are used as an additive in a particle-containing grease composition, the molybdenum disulfide particles can be easily interposed in the clearance between the friction surfaces and in very fine recesses of the friction surfaces in the sliding parts, the number of effective particles per unit weight to be added can be increased, and, as a result, even a small added amount of the molybdenum disulfide particles are highly effective in improving the friction and wear resistance properties and the friction and wear resistance properties can be efficiently improved.

Producing molybdenum disulfide particles using "nanometer-sized molybdenum disulfide particles", which the present applicant possesses, as a raw material allow the molybdenum disulfide particles to include not only a 2H structure but also an unusual 3R (rhombohedral crystal)

structure as the crystal structure of the molybdenum disulfide particles. According to this technology, the molybdenum disulfide particles are produced using the technology "nanometer-sized molybdenum trioxide fine particles", which the present applicant possesses, as the raw material, whereby "molybdenum disulfide having the 3R structure, advantageous in forming nanometer-sized particles and increasing a large specific surface area per unit weight, and having a plate-like structure", which is difficult to achieve by grinding mine products of the particle-containing grease composition or synthesizing from general-purpose molybdenum trioxide (micrometer size), can be synthesized. Therefore, the inventors of the present invention have found that when these molybdenum disulfide particles are used as an additive for the particle-containing grease composition, excellent friction and wear resistance properties can be exhibited due to the large specific surface area of the molybdenum disulfide particles.

That is, the present invention provides the following constitutions.

[1] A particle-containing grease composition comprising:
base oil;
a thickener; and
molybdenum disulfide particles, in which
a median diameter $D_{50}$ of the molybdenum disulfide particles determined by a dynamic light scattering method is 10 nm or more and less than 450 nm.

[2] The particle-containing grease composition according to [1], in which
a shape of primary particles of the molybdenum disulfide particles is a disk shape, a ribbon shape, or a sheet shape; and
a thickness is in a range of 3 nm to 100 nm.

[3] The particle-containing grease composition according to [1] or [2], in which a specific surface area of the molybdenum disulfide particles is 10 m²/g or more measured by a BET method.

[4] The particle-containing grease composition according to any one of [1] to [3], in which a bulk density of the molybdenum disulfide particles is 0.1 g/cm³ or more and 1.0 g/cm³ or less.

[5] The particle-containing grease composition according to any one of [1] to [4], in which in a radial distribution function of the molybdenum disulfide particles obtained from an extended X-ray absorption fine structure (EXAFS) profile of a K absorption edge of molybdenum, a ratio (I/II) of peak intensity I caused by Mo—S to peak intensity II caused by Mo—Mo is larger than 1.0.

[6] The particle-containing grease composition according to any one of [1] to [5], in which
the molybdenum disulfide particles have a 2H crystal structure and a 3R crystal structure of molybdenum disulfide,
in a profile of the molybdenum disulfide particles obtained from powder X-ray diffraction (XRD) using Cu-Kα rays as an X-ray source, a peak in the vicinity of 39.5° and a peak in the vicinity of 49.5° are derived from the 2H crystal structure, and a peak in the vicinity of 32.5°, a peak in the vicinity of 39.5°, and a peak in the vicinity of 49.5° are derived from the 3R crystal structure, and
half widths of the peak in the vicinity of 39.5° and a peak in the vicinity of 49.5° are 1° or more.

[7] The particle-containing grease composition according to [6], in which a crystallite size of the 3R crystal structure calculated by extended-type Rietveld analysis based on an analytical formula $L=K\lambda/(\beta \cos \theta)$ using a profile obtained from powder X-ray diffraction (XRD) using Cu-Kα rays as an X-ray source is 1 nm or more and 150 nm or less
(in the above formula, L is a crystallite size [m], K is an instrumental constant that depends on an XRD optical system (an incident side and a detector side) and settings, λ is a measured X-ray wavelength [m], β is a half width [rad], and θ is a Bragg angle of a diffraction line [rad]).

[8] The particle-containing grease composition according to [6] or [7], in which a presence ratio of the 2H crystal structure and the 3R crystal structure obtained by extended-type Rietveld analysis using the profile obtained from the XRD is 10:90 to 90:10.

[9] The particle-containing grease composition according to any one of [1] to [8], in which the molybdenum disulfide particles are contained in a ratio of 0.0001% by mass or more and 10% by mass or less with respect to 100% by mass of a total mass of the particle-containing grease composition.

Advantageous Effects of Invention

According to the present invention, a particle-containing grease composition that can efficiently improve friction and wear resistance properties with a small added amount and exhibits excellent friction and wear resistance properties even when a clearance and the surface roughness of the friction surface in sliding parts are extremely small can be provided.

DESCRIPTION OF EMBODIMENTS

Figure 1:
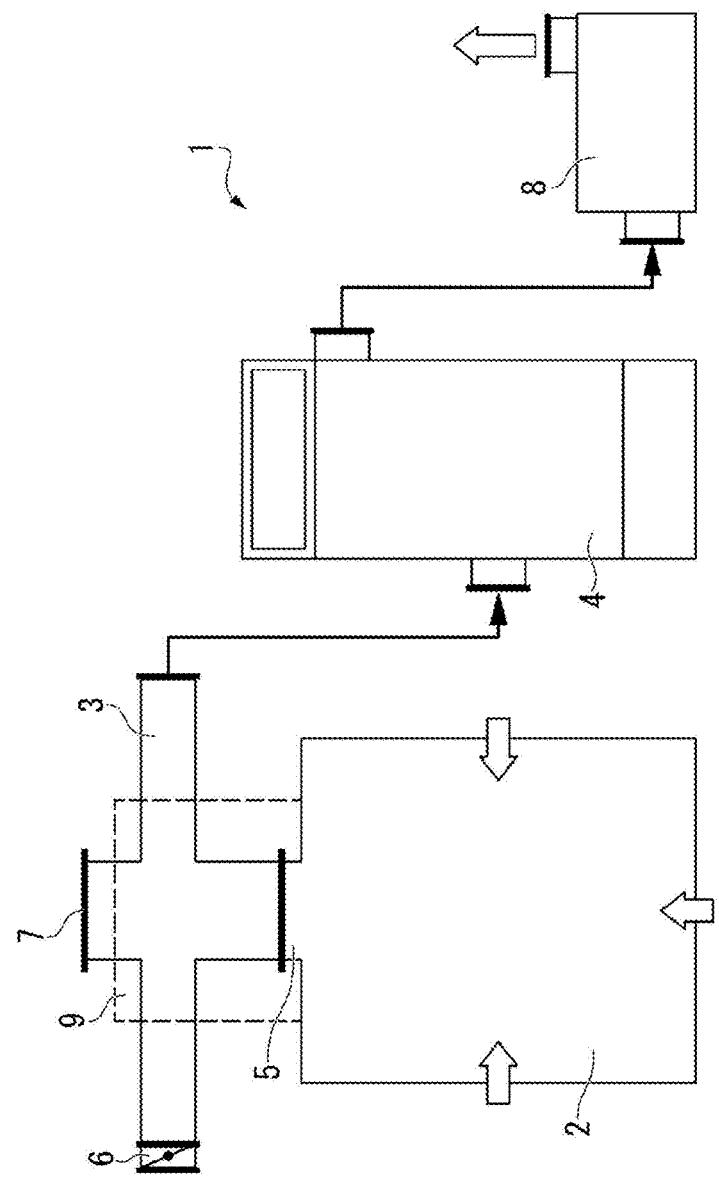
FIG. 1 is a schematic view showing one example of an apparatus used for production of molybdenum trioxide particles serving as a raw material of molybdenum disulfide particles according to the present embodiment.

Hereinafter, the embodiments of the present invention will be described in detail with reference to the drawings.
<Particle-Containing Grease Composition>

The particle-containing grease composition according to the present embodiment includes base oil, a thickener, and molybdenum disulfide particles, in which a median diameter $D_{50}$ of the molybdenum disulfide particles determined by a dynamic light scattering method is 10 nm or more and less than 450 nm.

Commercially available molybdenum disulfide particles are crushed ore products and includes many particles having a size larger than 0.45 μm in a particle diameter. Thus, for example, a clearance between friction surfaces in a sliding part is less than 0.45 μm (that is, 450 nm), the molybdenum disulfide particles cannot penetrate into the clearance and the number of effective molybdenum disulfide particles to be added per unit weight is small. On the other hand, when the median diameter $D_{50}$ is less than 450 nm as in the present embodiment, the molybdenum disulfide particles sufficiently penetrate into the clearance, the number of effective particles per unit weight of the molybdenum disulfide particles to be added increases, grinding, wear, or seizure is difficult to occur even under high loads, and thus the friction and wear properties can be efficiently improved.

Commercially available $MoS_2$ is crushed ore products and includes many particles having a size larger than 0.45 μm in a particle diameter and thus efficiency per unit weight for covering the area between contact surfaces is low. On the other hand, the molybdenum disulfide particles having a median diameter $D_{50}$ of less than 450 nm allow the molybdenum disulfide particles to easily penetrate into very fine recesses of either or both of the friction surfaces of two members even when the surface roughness of the friction surface is, for example, as extremely small as several hundred nanometers. Generally, molybdenum disulfide is penetrated into the clearance between the contact surfaces and this layer of molybdenum disulfide is easily shifted in a perpendicular direction to the load, whereby layered compounds containing molybdenum disulfide function well as lubricants. Therefore, the molybdenum disulfide particles also have an effect of reducing the friction coefficient between the contact surfaces by causing slippage between crystal surfaces when the layer of molybdenum disulfide is subjected to shear force that is a characteristic of layered compounds. Therefore, compared to conventional particle-containing grease compositions, the particle-containing grease composition of the present embodiment can prevent grinding, wear, and the like and, as a result, contributes to longer life of the friction surface.

(Molybdenum Disulfide Particles)

The median diameter $D_{50}$ of the molybdenum disulfide particles in the particle-containing grease composition according to the present embodiment obtained by the dynamic light scattering method is 10 nm or more and less than 450 nm, and particularly preferably 400 nm or less from the viewpoint of the above effects. The median diameter $D_{50}$ of the molybdenum disulfide particles may be 10 nm or more, 20 nm or more, or 40 nm or more. The median diameter $D_{50}$ of the molybdenum disulfide particles is measured using, for example, a dynamic light scattering-type particle diameter distribution analyzer (Nanotrac Wave II manufactured by MicrotracBEL Corp.) or a laser diffraction-type particle size distribution analyzer (SALD-7000 manufactured by Shimadzu Corporation).

The molybdenum disulfide particles in the particle-containing grease composition according to the present embodiment preferably contain the 3R crystal structure of molybdenum disulfide. It is conceivable that the molybdenum disulfide particles include the 3R crystal structure, in which the 6-membered ring unit lattice of any layer and the 6-membered ring unit lattice of the neighboring layer are present in a shifted state to form a rhombohedral crystal, whereby the interaction between sulfur atoms between layers (S—S contact) becomes weak and the layers of the 3R structure are more easily shifted from each other by external force compared to the 2H crystal structure, in which the 6-membered ring unit lattice of the neighboring layer is present at 90 degrees directly below the 6-membered ring unit lattice of any layer to form a regular hexagonal prismatic hexagonal crystal, resulting in contributing to further improvement of the friction and wear resistance properties.

Commercially available molybdenum disulfide particles generally include a large number of particles having a particle diameter of more than 0.45 μm, are hexagonal solids, and mainly have the 2H crystal structure as the crystal structure. On the contrary, the molybdenum disulfide particles produced by a "method for producing molybdenum trioxide particles" and a "method for producing molybdenum disulfide particles" described later include the 2H crystal structure and the 3R crystal structure, and the median diameter $D_{50}$ can be easily adjusted to 10 nm or more and less than 450 nm.

That the molybdenum disulfide particles have the 2H crystal structure and the 3R crystal structure can be found by, for example, using extended-type Rietveld analysis software (High Score Plus, manufactured by Malvern Panalytical Ltd.), which, for example, can take the crystallite size into consideration. This Rietveld analysis software can calculate the crystallite size in addition to crystal structure types and the ratio thereof that are calculated by common Rietveld analysis by simulating the entire diffraction profile of XRD using a crystal structure model including the crystallite size, comparing this profile to the diffraction profile of XRD obtained from experiments, optimizing the crystal lattice constant of the crystal structure model, crystal structure factors such as atomic coordinates, weight fractions (presence ratios), and the like with a least-square method so as to minimize the residue between the diffraction profile obtained from the experiment and the diffraction profile obtained by the calculation, and identifying and quantifying each phase of the 2H crystal structure and the 3R crystal structure with high precision. Hereafter, in the present patent, the above analysis method using High Score Plus will be referred to as "extended-type Rietveld analysis".

In the molybdenum disulfide particles according to the present embodiment, the crystallite size of the 3R crystal structure is preferably 1 nm or more and 150 nm or less. The molybdenum disulfide particles having a crystallite size of the 3R crystal structure of 1 nm or more and 150 nm or less allow the friction coefficient of the particle-containing grease composition to be lowered when used as a solid lubricant contained in the grease composition and thus the friction and wear resistance properties to be improved. The crystallite size of the 3R crystal structure is preferably a value calculated by the extended-type Rietveld analysis based on an analytical formula described below. The friction coefficient can be measured, for example, from a Stribeck curve using a Ball-on-Disk tester or a Four Ball tester or can also be measured using an SRV tester with reciprocating oscillation.

The crystallite size of the 3R crystal structure calculated by the extended-type Rietveld analysis based on an analytical formula $L=K\lambda/(\beta \cos \theta)$ using a profile obtained from powder X-ray diffraction (XRD) using Cu-K$\alpha$ rays as an X-ray source is preferably 1 nm or more and 150 nm or less, more preferably 1 nm or more and 50 nm or less, and still more preferably 1 nm or more and 15 nm or less. In the above formula, L is a crystallite size [m], K is an instrumental constant that depends on an XRD optical system (an incident side and a detector side) and settings, $\lambda$ is a measured X-ray wavelength [m], $\beta$ is a half width [rad], and $\theta$ is a Bragg angle of a diffraction line [rad]. In the present embodiment, for example, K=1.00 is adopted as the constant K that is an optimized value for the instrument for the extended-type Rietveld analysis using the above High Score Plus.

From the viewpoint of the effect described above, the 3R crystal structure obtained by the extended-type Rietveld analysis is preferably a crystal phase constituted of crystallites of which crystallite size obtained in accordance with the analytical formula described later is 1 nm or more. The crystallite size is more preferably 1 nm or more. From the viewpoint of the effect described above, the 3R crystal structure obtained by the extended-type Rietveld analysis is preferably a crystal phase constituted of crystallites of which crystallite size obtained in accordance with the analytical formula described later is 50 nm or less. The crystallite size is more preferably 15 nm or less. Further, from the viewpoint of the effect described above, the 3R crystal structure obtained by the extended-type Rietveld analysis is preferably a crystal phase constituted of crystallites of which crystallite size obtained in accordance with the above analytical formula is 1 nm or more and 50 nm or less. The crystallite size is more preferably 1 nm or more and 15 nm or less.

In the molybdenum disulfide particles according to the present embodiment, the crystallite size of the 2H crystal structure is preferably 1 nm or more. The crystallite size of the 2H crystal structure is preferably 150 nm or less. Further, the crystallite size of the 2H crystal structure is preferably 1 nm or more and 150 nm or less. The molybdenum disulfide particles having a crystallite size of the 2H crystal structure of 1 nm or more and 150 nm or less allow the friction coefficient of the particle-containing grease composition to be lowered when used as a solid lubricant contained in the grease composition and thus the friction and wear resistance properties to be improved.

The crystallite size of the 2H crystal structure is preferably a value calculated by the extended-type Rietveld analysis. The 2H crystal structure obtained by the extended-type Rietveld analysis is preferably a crystal phase constituted of crystallites whose crystallite size obtained in accordance with the analytical formula described later is 1 nm or more. The 2H crystal structure obtained by the extended-type Rietveld analysis is preferably a crystal phase constituted of crystallites of which a crystallite size obtained in accordance with the above analytical formula is 150 nm or less. Further, the 2H crystal structure obtained by the extended-type Rietveld analysis is preferably a crystal phase constituted of crystallites of which crystallite size obtained in accordance with the above analytical formula is 1 nm or more and 150 nm or less.

The crystallite size of the 2H crystal structure and the crystallite size of the 3R crystal structure can also be calculated using, for example, the peak half width of the XRD diffraction profile.

The presence ratio (2H:3R) of the 2H crystal structure and the 3R crystal structure in the crystal phase obtained by the extended-type Rietveld analysis using the profile obtained from the above XRD is preferably 10:90 to 90:10. The presence ratio of the 3R crystal structure in the crystal phase of 10% or more and 90% or less allows surface wear to be further reduced when the molybdenum disulfide particles are used as the inorganic lubricant.

From the viewpoint of the effect described above, the presence ratio (2H:3R) of the 2H crystal structure and the 3R crystal structure obtained by the extended-type Rietveld analysis using the profile obtained from the above XRD is more preferably 10:90 to 80:20 and still more preferably 40:60 to 80:20.

In the profile of the molybdenum disulfide particles obtained from the powder X-ray diffraction (XRD) using Cu-K$\alpha$ rays as an X-ray source, a peak in the vicinity of 39.5° and a peak in the vicinity of 49.5° are preferably derived from the 2H crystal structure, a peak in the vicinity of 32.5°, a peak in the vicinity of 39.5°, and a peak in the vicinity of 49.5° are preferably derived from the 3R crystal structure, and half widths of the peak in the vicinity of 39.5° and the peak in the vicinity of 49.5° are preferably 1° or more. Furthermore, the molybdenum disulfide particles may include a crystal structure such as a 1H crystal structure in addition to the 2H crystal structure and the 3R crystal structure of molybdenum disulfide.

That the molybdenum disulfide particles include the 3R crystal structure, which is a metastable structure, can be distinguished by forming the peak in the vicinity of 39.5° and the peak in the vicinity of 49.5° together from a synthesized peak of the 2H crystal structure and the 3R crystal structure in the profile obtained from the powder X-ray diffraction (XRD) using Cu-K$\alpha$ rays as the X-ray source.

In practice, the presence ratio of the 2H crystal structure is determined by the peak in the vicinity of 39.5° and the broad peak in the vicinity of 49.5° using the profile obtained from the above powder X-ray diffraction (XRD). The difference between the peak in the vicinity of 39.5° and the broad peak in the vicinity of 49.5° is optimized by two peaks in the vicinity of 32.5° and two peaks in the vicinity of 39.5° to determine the presence ratio of the 3R crystal structure. That is, both of the peak in the vicinity of 39.5° and the peak in the vicinity of 49.5° are synthetic waves derived from the 2H crystal structure and the 3R crystal structure and the presence ratio of the 2H crystal structure and the 3R crystal structure in the molybdenum disulfide particles can be calculated from these synthetic waves.

The molybdenum disulfide particles may also include an amorphous phase. The presence ratio of the amorphous phase in the molybdenum disulfide particles is represented by 100(%)−(degree of crystallinity (%)), and is preferably 5% or more, more preferably 15% or more, and still more preferably 20% or more. The molybdenum disulfide particles having a presence ratio of the amorphous phase of 5% or more allow the friction coefficient to be further reduced and the friction properties to be further improved.

Primary particles of the molybdenum disulfide particles in a two-dimensional image when the molybdenum disulfide particles are photographed with a transmission electron microscopy (TEM) may have a particle shape, a spherical shape, a plate shape, a needle shape, a string shape, a ribbon shape, or a sheet shape or may have a combination of these shapes. The shape of the primary particles of the molybdenum disulfide particles is preferably a disk shape, the ribbon shape, or the sheet shape. The shape of the primary particles of 50 molybdenum disulfide particles preferably has a size in the range of length (vertical)×width (horizontal)=50 nm to 1,000 nm×50 nm to 1,000 nm, more preferably a size in the range of 100 nm to 500 nm×100 nm to 500 nm, and particularly preferably a size in the range of 50 nm to 200 nm×50 nm to 200 nm. The shape of the primary particles of the molybdenum disulfide particles preferably has a thickness that is measured with an atomic force microscope (AFM) in a size in the range of 3 nm or more, and more preferably in a size in the range of 5 nm or more. The shape of the primary particles of the molybdenum disulfide particles preferably has a thickness that is measured with an atomic force microscope (AFM) in a size in the range of 100 nm or less, more preferably in a size in the range of 50 nm or less, and particularly preferably in a size in the range of 20 nm or less. The shape of the primary particles of the molybdenum disulfide particles may have a thickness that is measured with an atomic force microscope (AFM) in a size in the range of 40 nm or less, and in a size in the range of 30 nm or less. When the shape of the primary particles of the molybdenum disulfide particles is the disk shape, the ribbon shape, or the sheet shape, the specific surface area of the molybdenum disulfide particles can be increased. The shape of the primary particles of the molybdenum disulfide particles is preferably the disk shape, the ribbon shape, or the sheet shape and preferably has a thickness in the range of 3 nm to 100 nm. Here, the disk shape, the ribbon shape, or the sheet shape means a thin layer shape. There is no clear distinction among the disk shape, the ribbon shape, and the sheet shape. For example, when the thickness is 10 nm or less, the shape can be determined to be the sheet shape; when the thickness is 10 nm or more and length/width is equal to or more than 2, the shape can be determined to be the ribbon shape; and when the thickness is 10 nm or more and length/width is less than 2, the shape can be determined to be the disk shape. The aspect ratio of the primary particles of the molybdenum disulfide particles, that is, a value of (Length (longitudinal and transverse size))/(Thickness (height)) is preferably 1.2 to 1,200, more preferably 2 to 800, still more preferably 5 to 400, and particularly preferably 10 to 200 on average of 50 particles. In the shape of the primary particles of 50 molybdenum disulfide particles, the shape, the length, the width, and the thickness can also be measured by the atomic force microscope (AFM) and the aspect ratio can be calculated from the measurement results.

It is conceivable that the shape of the primary particles of the molybdenum disulfide particles is not a simple spherical shape but is the disk shape, the ribbon shape, or the sheet shape having a large aspect ratio, whereby the molybdenum disulfide particles are more efficiently interposed between the particle-containing grease composition and the friction surface of the sliding part and thus reduction in the probability of contact (or contact area×time) between the friction surfaces is expected, resulting in reducing the surface wear.

The specific surface area of the molybdenum disulfide particles measured by a BET method is preferably 10 m$^2$/g or more, more preferably 30 m$^2$/g or more, and particularly preferably 40 m$^2$/g or more. The specific surface area of the molybdenum disulfide particles measured by the BET method may be 300 m$^2$/g or less or 200 m$^2$/g or less.

In the primary particles of the molybdenum disulfide particles, layers can be easily shifted from each other by external forces such as friction because each layer constituting the primary particles is approached by relatively weak interaction. Therefore, when the primary particles of the molybdenum disulfide particles are interposed between the friction surfaces of the sliding part to generate friction force, the layers constituting the primary particles are shifted from each other by the friction force to lower an apparent friction coefficient and contact between the friction surfaces can also be prevented.

The molybdenum disulfide particles having a specific surface area measured by the BET method of 10 m$^2$/g or more allow the contact area with the friction surfaces to be increased and the area of contact between the friction surfaces of the sliding parts to be reduced more when the primary particles are present between the friction surfaces of the sliding parts, resulting in exhibiting excellent friction and wear resistance properties.

The particle-containing grease composition of the present embodiment, which contains molybdenum disulfide particles having a specific surface area of 10 m$^2$/g or more measured by the BET method can increase the contact area between the molybdenum disulfide particles and the friction surface and thus can exhibit the excellent friction and wear resistance properties.

The bulk density of the molybdenum disulfide particles is preferably 0.1 g/cm$^3$ or more, more preferably 0.2 g/cm$^3$ or more, and still more preferably 0.4 g/cm$^3$ or more. The bulk density of the molybdenum disulfide particles is preferably 1.0 g/cm$^3$ or less, more preferably 0.9 g/cm$^3$ or less, and still more preferably 0.7 g/cm$^3$ or less. Further, the bulk density of molybdenum disulfide particles is preferably 0.1 g/cm$^3$ or more and 1.0 g/cm$^3$ or less and more preferably 0.2 g/cm$^3$ or more and 0.9 g/cm$^3$ or less. The molybdenum disulfide particles having a bulk density of 0.1 g/cm$^3$ or more and 1.0 g/cm$^3$ or less allow the molybdenum disulfide particles to be more easily exposed to the surface of the particle-containing grease composition compared to the case where molybdenum disulfide particles having relatively high bulk density are contained in the grease composition at the same content and the friction coefficient of the particle-containing grease composition to be further reduced. In addition, the desired friction and wear resistance properties are allowed to be obtained with a smaller content as compared to the case where molybdenum disulfide particles having a relatively high bulk density are contained as described above. Therefore, the weight reduction in the molded product using the particle-containing grease composition can be achieved.

In the radial distribution function of the molybdenum disulfide particles obtained from an extended X-ray absorption fine structure (EXAFS) profile of the K absorption edge of molybdenum, a ratio (I/II) of peak intensity I caused by Mo—S to peak intensity II caused by Mo—Mo is preferably 1.0 or more, more preferably 1.1 or more, and particularly preferably 1.2 or more.

In the crystal structure of molybdenum disulfide, the distance between Mo and S is almost the same in the 2H crystal structure and the 3R crystal structure due to a covalent bond, so that the peak intensity caused by Mo—S is the same in the 2H crystal structure and the 3R crystal structure in the extended X-ray absorption fine structure (EXAFS) profile of the K absorption edge of molybdenum. On the other hand, since the 2H crystal structure of molybdenum disulfide is the hexagonal crystal, the hexagon is located 90° directly below the same hexagon of Mo atoms, and thus the distance between Mo and Mo is shorter, and the peak intensity II caused by Mo—Mo is stronger.

Conversely, since the 3R crystal structure of molybdenum disulfide is the rhombohedral crystal, the hexagon is present not 90° directly below the hexagon but shifted by half of the hexagon, and thus the distance between Mo and Mo becomes larger and the peak intensity II caused by Mo—Mo is weaker.

The ratio (I/II) is smaller in a pure 2H crystal structure of molybdenum disulfide, but the ratio (I/II) is larger as molybdenum disulfide has the 3R crystal structure.

In the 3R crystal structure, the hexagons of the Mo atoms in each of the three layers are shifted from each other by half of the hexagon, and thus the interaction between layers is smaller as compared to the 2H crystal structure, in which the hexagons of Mo atoms in two layers are regularly arranged vertically, resulting in improving the friction and wear resistance properties due to the slip between crystal planes by shear force because the interaction between the layers is small.

In the 2H crystal structure, it can be expected that a smaller crystallite size facilitates the occurrence of slippage on the contact surface.

The conversion ratio $R_C$ of the molybdenum disulfide trioxide particles to $MoS_2$ is preferably 70% or more, more preferably 80% or more, and still more preferably 90% or more because the presence of molybdenum trioxide is considered to adversely affect the friction and wear resistance properties.

The molybdenum disulfide particles exhibit lubricating performance due to heating by friction by indicating a digit of the conversion ratio $R_C$ to $MoS_2$ close to 100% and can provide superior friction and wear resistance properties to other molybdenum disulfide materials and precursors thereof with which molybdenum trioxide may be produced as a by-product or in which molybdenum trioxide may be contained.

The conversion ratio $R_C$ of the molybdenum trioxide particles to $MoS_2$ can be determined from the profile data obtained by X-ray diffraction (XRD) measurement of the molybdenum disulfide particles by a RIR (reference intensity ratio) method. The conversion ratio $R_C$ to $MoS_2$ can be obtained from the following formula (1) using a RIR value $K_A$ of molybdenum disulfide ($MoS_2$) and an integrated intensity $I_A$ of the peak in the vicinity of 2θ=14.4°±0.5° attributed to the (002) plane or the (003) plane of molybdenum disulfide ($MoS_2$), and a RIR value $K_B$ of each molybdenum oxide (for example, $MoO_3$ as a raw material and $Mo_9O_{25}$, $Mo_4O_{11}$, $MoO_2$ etc. as reaction intermediates) and an integrated intensity IB of the strongest line peak of each molybdenum oxide ($MoO_3$ as a raw material, and $Mo_9O_{25}$, $Mo_4O_{11}$, $MoO_2$, etc. as reaction intermediates).

$$R_C(\%)=(I_A/K_A)/(\Sigma(I_B/K_B))\times 100 \quad (1)$$

Here, the values described in the inorganic crystal structure database (ICSD) (produced by Japan Association for International Chemical Information) can be used as the RIR values and integrated powder X-ray diffraction software (PDXL2) (manufactured by Rigaku Corporation) can be used for analysis.

The particle-containing grease composition according to the present embodiment preferably includes the molybdenum disulfide particles ($MoS_2$), but are not limited thereto. The composition may also contain molybdenum sulfide particles represented by $MoS_x$ (X=1 to 3) or one or more kinds of molybdenum sulfide particles represented by $MoS_x$ (X=1 to 3) may also be contained.

The particle-containing grease composition according to the present embodiment preferably contains 0.0001% by mass or more, more preferably 0.01% by mass or more, and still more preferably 1% by mass or more of the molybdenum disulfide particles with respect to 100% by mass of the total mass of the particle-containing grease composition.

The particle-containing grease composition preferably contains 50% by mass or less, more preferably 20% by mass or less, and still more preferably 10% by mass or less of the molybdenum disulfide particles with respect to 100% by mass of the total mass of the particle-containing grease composition. Further, the particle-containing grease composition preferably contains 0.0001% by mass or more and 50% by mass or less, more preferably 0.01% by mass or more and 20% by mass or less, and still more preferably 1% by mass or more and 10% by mass or less of the molybdenum disulfide particles with respect to 100% by mass of the total mass of the particle-containing grease composition.

(Base Oil)

The base oil used for the particle-containing grease composition according to the present embodiment is not particularly limited and any known base oil can be used. Example of the base oil include one or more types of oil selected from naphthenic and/or paraffinic mineral oil (for example, spindle oil, turbine oil, motor oil, and bright stock) and synthetic oil (for example, diesters, polyol esters, silicone oil, PFPE (perfluorinated polyethers), PAO (polyalphaolefins), PAG (polyalkylene glycols), alkyl diphenyl ethers, and polyphenyl ethers).

The particle-containing grease composition can contain 50% by mass or more, and more preferably contains 70% by mass or more, preferably 99% by mass or less, and still more preferably 95% by mass or less of the base oil with respect to 100% by mass of the total mass of the particle-containing grease composition. The base oil can be contained from 50% by mass or more and 99% by mass or less, and preferably contained from 70% by mass or more and 95% by mass or less with respect to 100% by mass of the total mass of the particle-containing grease composition.

(Thickener)

The thickener used in the particle-containing grease composition according to the present embodiment is not particularly limited. Soap-based thickeners or non-soap-based thickeners can be used.

Examples of the soap-based thickeners include one or more types of thickeners selected from Ca soaps (beef tallow-based or castor oil-based), Li complex soaps, Ba complex soaps, Al soaps, Ca complex soaps, Li complex soaps, and Al complex soaps. Examples of the non-soap-based thickeners include one or more types of thickeners selected from urea compounds (aromatic diurea, aliphatic or alicyclic diurea, triurea, and tetraurea), Na-terephthalate, PTFE, bentonite, silica gel, and carbon black.

The particle-containing grease composition can contain 2% by mass or more and may contain 5% by mass or more of the thickener with respect to 100% by mass of the total mass of the particle-containing grease composition. The particle-containing grease composition can contain 60% by mass or less and may contain 30% by mass or less of the thickener with respect to 100% by mass of the total mass of the particle-containing grease composition. Furthermore, the particle-containing grease composition can contain 2% by mass or more and 60% by mass or less and may contain 5% by mass or more and 30% by mass or less of the thickener with respect to 100% by mass of the total mass of the particle-containing grease composition.

(Load-Bearing Additive)

The particle-containing grease composition according to the present embodiment may further contain a load-bearing additive from the viewpoint of reducing friction and wear between friction surfaces and preventing seizure. Examples of the load-bearing additive include one or more of compounds selected from Pb naphthenate, chlorinated paraffins, SP-based compounds, various metal compounds, phosphorus-based compounds such as MoDTP and ZnDTP, and sulfur-based compounds.

The particle-containing grease composition can contain 0.01% by mass or more, and may contain 0.1% by mass or more or 1% by mass or more of the load-bearing additive with respect to 100% by mass of the total mass of the particle-containing grease composition. The particle-containing grease composition can contain 50% by mass or less, and may contain 20% by mass or less or 10% by mass or less of the load-bearing additive with respect to 100% by mass of the total mass of the particle-containing grease composition. Furthermore, the particle-containing grease composition can contain 0.01% by mass or more and 50% by mass or less, and may contain 0.1% by mass or more and 20% by mass or less or 1% by mass or more and 10% by mass or less of the load-bearing additive with respect to 100% by mass of the total mass of the particle-containing grease composition.

(Other Additives)

The particle-containing grease composition according to the present embodiment may contain additives other than the additives described above, depending on applications and specifications. As other additives, one or more types of antioxidants (sulfur, phosphorus-based, amine-based, and phenol-based), rust inhibitors (for example, carboxylic acids and metal sulfonates), corrosion inhibitors (for example, benzotriazole), oily agents (for example, fatty acids and fatty acid esters), wear prevention agents (for example, phosphate esters, phosphite esters, thiophosphate salts, amine salts of phosphate esters, and zinc dialkyl dithiocarbamates), extreme pressure agents (for example, sulfurized fatty oil, sulfurized esters, polysulfides, chlorine compounds, lead naphthenate, amine alkyl thiophosphates, and chloroalkyl xanthates), solid lubricants (for example, graphite, $MoS_2$, and soft metals), viscosity index improvers (for example, polyalkyl methacrylate), clean dispersants (for example, metal sulfonates and succinic acid imide) can be used.

The particle-containing grease composition can contain 0.01% by mass or more, and may contain 0.1% by mass or more or 0.2% by mass or more of the above additives with respect to 100% by mass of the total mass of the particle-containing grease composition. The particle-containing grease composition can contain 50% or less, and may contain 10% by mass or less or 5% by mass or less of the above additives with respect to 100% by mass of the total mass of the particle-containing grease composition. The particle-containing grease composition can contain 0.01% by mass or more and 50% by mass or less, and may contain 0.1% by mass or more and 10% by mass or less or 0.2% by mass or more and 5% by mass or less of the additives with respect to 100% by mass of the total mass of the particle-containing grease composition.

<Method for Producing Particle-Containing Grease Compositions>

The method for producing a particle-containing grease composition according to the present embodiment includes uniformly mixing the base oil, the thickener, and the molybdenum disulfide particles obtained by the method for producing molybdenum disulfide particles described later in the blending proportion described above, whereby the particle-containing grease composition can be produced. Extreme pressure agents and other additives may be further added to the raw materials and uniformly mixed, if necessary. The molybdenum disulfide particles may be added together with the raw materials including the base oil and the thickener as described above, or, from the viewpoint of uniform dispersion of the molybdenum disulfide particles, a grease composition may be previously produced by mixing the raw materials including the base oil and the thickener, and then the molybdenum disulfide particles may be added to this grease composition in a semi-solid state. In this case, the molybdenum disulfide particles can be uniformly dispersed in the grease composition by kneading with, for example, a Hoover muller, a planetary centrifugal mixer, a three-roll mill, a Charlotte colloid mill, or a Manton-Gaulin homogenizer.

The particle-containing grease composition according to the present embodiment is a semi-solid state (gel state) at room temperature in the present invention. When applied to sliding parts of machine elements, the grease changes the state to liquid (lubricating composition) by frictional heat during sliding to penetrate into the sliding parts and forms a thin film on the surface (friction surface) of solids that constitute the sliding parts such as metals and resins to lubricate the sliding parts. At this time, the particle-containing grease composition or the molybdenum disulfide particles contained in the above liquid are supplied to the sliding parts and the very fine recesses of the friction surfaces, thereby reducing friction and wear on the sliding parts. When sliding stops, the temperature drops and the lubricating composition in the liquid state reverts to the semi-solid particle-containing grease composition again.

By containing the molybdenum disulfide particles, the particle-containing grease composition according to the present embodiment has excellent friction and wear resistance properties such as, in particular, low wear, high seizure load, and high fusion load, and further, the excellent friction and wear resistance properties can be sustained for a long period of time. In addition, the particle-containing grease composition according to the present embodiment can avoid contamination due to oil leakage because the grease composition reverts to the gel (semi-solid state) structure even after repeated temperature rising and cooling stresses associated with use and non-use.

(Method for Producing Molybdenum Disulfide Particles in Particle-Containing Grease Composition)

The molybdenum disulfide particles in the particle-containing grease composition according to the present embodiment can be produced, for example, by heating molybdenum trioxide particles in the presence of a sulfur source at a temperature of 200° C. to 1,150° C.

The average particle diameter of the primary particles of the molybdenum trioxide particles is preferably 2 nm or more and 2,000 nm or less. The average particle diameter of the primary particles of the molybdenum trioxide particles refers to an average value of the primary particle diameters of randomly selected 50 primary particles when the molybdenum trioxide particles are photographed with a scanning electron microscope (SEM) or a transmission electron microscope (TEM), the major axis (the Feret diameter of the longest portion observed) and the minor axis (the short Feret diameter in a direction perpendicular to the Feret diameter of the longest portion) of the minimum unit particles (that is, the primary particles) constituting aggregates on a two-dimensional image are measured, and an average value thereof is defined as the primary particle diameter.

In the method for producing a molybdenum sulfide powder according to the present embodiment, the molybdenum trioxide powder preferably has a $MoO_3$ content of 99.5% or more as measured by fluorescent X-ray (XRF), whereby the conversion ratio $R_c$ to $MoS_2$ can be increased, and molybdenum disulfide having high purity and good storage stability, which generates no disulfides derived from impurities, can be obtained.

The average particle diameter of the primary particles of the molybdenum trioxide particles may be 5 nm or more and 2,000 nm or less. The average particle diameter of the primary particles of the molybdenum trioxide particles is preferably 1,000 nm or less. From the viewpoint of reactivity with sulfur, the average particle diameter is more preferably 600 nm or less, still more preferably 400 nm or less, and particularly preferably 200 nm or less. The average particle diameter of the primary particles of the molybdenum trioxide particles may be 2 nm or more, 5 nm or more, or 10 nm or more.

Examples of the sulfur source include sulfur and hydrogen sulfide. These sulfur sources may be used alone or in combination of two sulfur sources.

The molybdenum trioxide particles preferably have a specific surface area of 10 m²/g or more and 100 m²/g or less measured by the BET method.

In the molybdenum trioxide particles, the specific surface area is preferably 10 m²/g or more, more preferably 20 m²/g or more, and still more preferably 30 m²/g or more from the viewpoint of excellent reactivity with sulfur. In the molybdenum trioxide particles, the specific surface area is preferably 100 m²/g or less, may be 90 m²/g or less, or may be 80 m²/g or less from the viewpoint of facilitation in production.

The molybdenum trioxide particles used for producing the molybdenum disulfide particles are preferably made of an aggregate of primary particles containing molybdenum trioxide having a β crystal structure. Since the molybdenum oxide particles have better reactivity with sulfur than conventional molybdenum trioxide particles having α crystals alone as a crystal structure and contain molybdenum trioxide having the β crystal structure, the conversion ratio $R_c$ to $MoS_2$ can increase in a reaction with the sulfur source.

The β crystal structure of molybdenum trioxide can be observed by the presence of a peak (in the vicinity of 2θ:23.01°, No. 86426 (inorganic crystal structure database, ICSD)) attributed to the plane (011) of a β crystal of $MoO_3$ in a profile obtained by the powder X-ray diffraction (XRD) using the Cu-Kα rays as the X-ray source. The α crystal structure of molybdenum trioxide can be observed by the presence of a peak of the plane (021) (in the vicinity of 2θ:27.32°, No. 166363 (inorganic crystal structure database, ICSD)) of the α crystal of $MoO_3$.

In the method for producing molybdenum disulfide particles, the molybdenum trioxide particles preferably have a ratio (β(011)/α(021)) of intensity of a peak attributed to the plane (011) of the β crystal of $MoO_3$ (in the vicinity of 2θ:23.01°, No. 86426 (inorganic crystal structure database (ICSD)) to intensity of a peak attributed to the plane (021) of the α crystal of $MoO_3$ (in the vicinity of 2θ:27.32°, No. 166363 (inorganic crystal structure database (ICSD)) of 0.1 or more in the profile obtained by the powder X-ray diffraction (XRD) using the Cu-Kα rays as the X-ray source.

From the peak intensity attributed to the plane (011) of the β crystal of $MoO_3$ and the peak intensity attributed to the plane (021) of the α crystal of $MoO_3$, each maximum peak intensity is read to determine the ratio (β(011)/α(021)).

In the molybdenum trioxide particles, the ratio (β(011)/α(021)) is preferably 0.1 to 10.0, more preferably 0.2 to 10.0, and particularly preferably 0.4 to 10.0.

The β crystal structure of molybdenum trioxide can also be observed by the presence of peaks at wavenumbers of 773 cm⁻¹, 848 cm⁻¹, and 905 cm⁻¹ in a Raman spectrum obtained by Raman spectroscopy. The α crystal structure of molybdenum trioxide can be observed by the presence of peaks at wavenumbers of 663 cm⁻¹, 816 cm⁻¹, and 991 cm⁻¹.

In the molybdenum trioxide particles, a ratio (I/II) of peak intensity I caused by Mo—O to peak intensity II caused by Mo—Mo is preferably more than 1.1 in the radial distribution function obtained from the extended X-ray absorption fine structure (EXAFS) profile of the K absorption edge of molybdenum.

As for the peak intensity I caused by Mo—O and the peak intensity II caused by Mo—Mo, each maximum peak intensity is read to obtain the ratio (I/II). The ratio (I/II) is considered to indicate that the β crystal structure of $MoO_3$ is obtained in the molybdenum trioxide particles, and the greater the ratio (I/II), the better the reactivity with sulfur.

In the molybdenum trioxide particles, the ratio (I/II) is preferably 1.1 to 5.0, and may be 1.2 to 4.0 or may be 1.2 to 3.0.

The method for producing molybdenum disulfide used in the grease composition according the present embodiment may include heating the molybdenum trioxide particles made of the aggregate of the primary particles containing molybdenum trioxide having the β crystal structure at a temperature of 100° C. to 800° C. in the absence of the sulfur source, and then heating the molybdenum trioxide particles at a temperature of 200° C. to 1,000° C. in the presence of the sulfur source.

The heating time in the presence of the sulfur source may be 1 hour to 20 hours, 2 hours to 15 hours, or 3 hours to 10 hours as long as the sulfurization reaction proceeds sufficiently.

In the method for producing molybdenum disulfide particles, the feed ratio of the amount of S in the sulfur source to the amount of $MoO_3$ in the molybdenum trioxide particles is preferably set under conditions under which the sulfurization reaction proceeds sufficiently. With respect to 100 mol % of the amount of $MoO_3$ in the molybdenum trioxide particles, the amount of S in the sulfur source is preferably 450 mol % or more, preferably 600 mol % or more, and preferably 700 mol % or more. With respect to 100 mol % of the amount of $MoO_3$ in the molybdenum trioxide particles, the amount of S in the sulfur source may be 3,000 mol % or less, 2,000 mol % or less, or 1,500 mol % or less.

In the method for producing molybdenum disulfide particles, the heating temperature in the presence of the sulfur source may be any temperature at which the sulfurization reaction proceeds sufficiently, and is preferably 320° C. or more, more preferably 340° C. or more, and particularly preferably 360° C. or more. The heating temperature may be 320° C. to 1,000° C., 340° C. to 1,000° C., or 360° C. to 500° C.

In the method for producing molybdenum disulfide particles, the obtained molybdenum disulfide particles may be cooled and then heated as post-treatment, if necessary. In this heating treatment, for example, the molybdenum disulfide particles are preferably calcined in an inert atmosphere. Heating and calcining the obtained molybdenum disulfide particles allow crystallization of the amorphous portion to be promoted and the degree of crystallinity to increase. With the increase in the degree of crystallinity, each of the new 2H crystal structure and the 3R crystal structure is generated, and the presence ratio of the 2H crystal structure and 3R crystal structure varies. As described above, performing reheating as post-treatment allows the degree of crystallinity of the molybdenum disulfide particles to increase and the ease of peeling by lubrication of each layer to decrease to some extent. However, the presence ratio of the 3R crystal structure, which contributes to improvement in friction properties, increases and thus the friction properties can be improved as compared to the case where the 2H crystal structure alone is present. The presence ratio of the 2H crystal structure to the 3R crystal structure can be adjusted by varying the temperature at which the obtained molybdenum disulfide particles are heated.

As described above, the molybdenum disulfide particles contained in the particle-containing grease composition according to the present embodiment can be produced by the method for producing molybdenum disulfide particles.

(Method for Producing Molybdenum Trioxide Particles)

The molybdenum trioxide particles can be produced by vaporizing a molybdenum oxide precursor compound to form molybdenum trioxide vapor and cooling the molybdenum trioxide vapor.

The method for producing molybdenum trioxide particles includes calcining a raw material mixture containing the molybdenum oxide precursor compound and a metal compound other than the molybdenum oxide precursor compound to vaporize the molybdenum oxide precursor compound so as to form molybdenum trioxide vapor. The ratio of the metal compound with respect to 100% by mass of the raw material mixture is preferably 70% by mass or less in terms of oxide.

The method for producing molybdenum trioxide particles can be suitably performed by using a production apparatus 1 shown in FIG. 1.

FIG. 1 is a schematic view showing an example of an apparatus used for producing molybdenum trioxide particles serving as a raw material of the molybdenum disulfide particles in the present embodiment.

As shown in FIG. 1, the production apparatus 1 includes a calcining furnace 2 for calcining the molybdenum trioxide precursor compound or the raw material mixture to vaporize the molybdenum trioxide precursor compound, a cross-shaped cooling pipe 3 connected to the calcining furnace 2 for particle forming the molybdenum trioxide vapor vaporized by the calcining, and a collection device 4 as a collection unit for collecting the molybdenum trioxide particles made by forming particles in the cooling pipe 3. At this time, the calcining furnace 2 and the cooling pipe 3 are connected to each other via a discharge port 5. Further, in the cooling pipe 3, an opening degree adjustment damper 6 is disposed at an outside air intake port (not shown) at a left end portion, and an observation window 7 is disposed at an upper end portion. An air exhauster 8, which is a first air blowing unit, is connected to the collection device 4. When the air exhauster 8 exhausts air, the collection device 4 and the cooling pipe 3 suction the air, and the outside air is blown into the cooling pipe 3 from the opening degree adjustment damper 6 of the cooling pipe 3. That is, the air exhauster 8 passively blows air to the cooling pipe 3 by exhibiting a suction function. The production apparatus 1 may include an external cooling device 9, which allows cooling conditions for the molybdenum trioxide vapor generated from the calcining furnace 2 to be arbitrarily controlled.

Air is taken from the outside air intake port by opening the opening degree adjustment damper 6 and the molybdenum trioxide vapor vaporized in the calcining furnace 2 is cooled in an air atmosphere to obtain molybdenum trioxide particles, whereby the ratio (I/II) can be made more than 1.1, and the R crystal structure of $MoO_3$ can be easily obtained in the molybdenum trioxide particles. When the molybdenum trioxide vapor is cooled in a state where an oxygen concentration in a nitrogen atmosphere is low, for example, when the molybdenum trioxide vapor is cooled using liquid nitrogen, the oxygen defect density is likely to increase and the ratio (I/II) is likely to decrease.

The molybdenum trioxide precursor compound is not particularly limited as long as it forms molybdenum trioxide vapor by being calcined, and examples thereof include metal molybdenum, molybdenum trioxide, molybdenum dioxide, molybdenum sulfide, ammonium molybdate, phosphomolybdic acid ($H_3PMo_{12}O_{40}$), silicomolybdic acid ($H_4SiMo_{12}O_{40}$), aluminum molybdate, silicon molybdate, magnesium molybdate ($MgMo_nO_{3n+1}$ (n=1 to 3)), sodium molybdate ($Na_2Mo_nO_{3n+1}$ (n=1 to 3)), titanium molybdate, ferric molybdate, potassium molybdate ($K_2MonO_{3n+1}$ (n=1 to 3)), zinc molybdate, boron molybdate, lithium molybdate ($Li_2Mo_nO_{3n+1}$ (n=1 to 3)), cobalt molybdate, nickel molybdate, manganese molybdate, chromium molybdate, cesium molybdate, barium molybdate, strontium molybdate, yttrium molybdate, zirconium molybdate, and copper molybdate. These molybdenum oxide precursor compounds may be used alone or in combination of two or more thereof. The form of the molybdenum oxide precursor compound is not particularly limited and may be, for example, in a powder form such as molybdenum trioxide, and preferably in a powder form having good handling properties and good energy efficiency.

As the molybdenum oxide precursor compound, commercially available α-crystal molybdenum trioxide is preferably used. Further, when ammonium molybdate is used as the molybdenum trioxide precursor compound, the ammonium molybdate is converted by calcining into molybdenum trioxide that is thermodynamically stable, and thus the molybdenum trioxide precursor compound to be vaporized turns into molybdenum trioxide.

The molybdenum trioxide vapor can also be formed by calcining a raw material mixture containing the molybdenum trioxide precursor compound and a metal compound other than the molybdenum trioxide precursor compound. Among these molybdenum trioxide precursor compounds, the molybdenum trioxide precursor compound preferably includes molybdenum trioxide from the viewpoint of easily controlling the purity of the obtained molybdenum trioxide particles, the average particle diameter of the primary particles, and the crystal structure.

The calcining temperature varies depending on the molybdenum trioxide precursor compound and the metal compound to be used, and the desired molybdenum trioxide particles, and is usually preferably a temperature at which the intermediate can be decomposed. For example, since aluminum molybdate can be formed as an intermediate when a molybdenum compound is used as the molybdenum trioxide precursor compound and an aluminum compound is used as the metal compound, the calcining temperature is preferably 500° C. to 1,500° C., more preferably 600° C. to 1,550° C., and still more preferably 700° C. to 1,600° C.

The calcining time is also not particularly limited, and may be, for example, 1 minute to 30 hours, 10 minutes to 25 hours, or 100 minutes to 20 hours.

The temperature rising rate varies depending on the properties of the molybdenum trioxide precursor compound and the metal compound to be used and the desired molybdenum trioxide particles, and is preferably 0.1° C./minute to 100° C./minute, more preferably 1° C./minute to 50° C./minute, and still more preferably 2° C./minute to 10° C./minute from the viewpoint of production efficiency.

Next, the molybdenum trioxide vapor is cooled to be powdered.

The molybdenum trioxide vapor is cooled by lowering the temperature of the cooling pipe. In this case, examples of a cooling method include cooling by blowing a gas into the cooling pipe as described above, cooling by a cooling mechanism included in the cooling pipe, and cooling by an external cooling device.

The molybdenum trioxide vapor is preferably cooled in an air atmosphere. When the molybdenum trioxide vapor is cooled in an air atmosphere to form molybdenum trioxide particles, the ratio (I/II) can be made more than 1.1, and the β crystal structure of $MoO_3$ can be easily obtained in the molybdenum trioxide particles.

The cooling temperature (temperature of the cooling pipe) is not particularly limited, and is preferably −100° C. to 600° C., and more preferably −50° C. to 400° C.

The cooling rate of the molybdenum trioxide vapor is not particularly limited, and is preferably 100° C./s or more and 100,000° C./s or less and more preferably 1,000° C./s or more and 50,000° C./s or less. As the cooling rate of the molybdenum trioxide vapor increases, molybdenum trioxide particles having a smaller particle diameter and a larger specific surface area tend to be obtained.

When the cooling method is cooling by blowing a gas into the cooling pipe, the temperature of the blown gas is preferably −100° C. to 300° C., and more preferably −50° C. to 100° C.

The powder obtained by cooling the molybdenum trioxide vapor is transported to the collection device for collection.

In the method for producing the molybdenum trioxide particles, the powder obtained by cooling the molybdenum trioxide vapor may be calcined again at a temperature of 100° C. to 320° C.

That is, the molybdenum trioxide particles obtained by the method for producing molybdenum trioxide particles may be calcined again at a temperature of 100° C. to 320° C. The calcining temperature in the re-calcining may be 120° C. to 280° C. or 140° C. to 240° C. A calcining time in the re-calcining may be, for example, 1 minute to 4 hours, 10 minutes to 5 hours, or 100 minutes to 6 hours. However, a part of the β crystal structure of molybdenum trioxide disappears due to re-calcining, and when calcining is performed at a temperature of 350° C. or more for 4 hours, the β crystal structure of the molybdenum trioxide particles disappears, the ratio (β(011)/α(021)) is 0, and the reactivity with sulfur is impaired.

As described above, the molybdenum trioxide particles suitable for producing the molybdenum disulfide particles contained in the particle-containing grease composition according to the present embodiment can be produced by the method for producing molybdenum trioxide particles.

EXAMPLES

Next, the present invention will be described in more detail with reference to Examples. However, the present invention is not limited to Examples described later. In Examples described later, "part by mass" represents "% by mass" unless otherwise noted.

[Method for Measuring Average Particle Diameter of Primary Particles of Molybdenum Trioxide Particles]

Molybdenum trioxide particles constituting a molybdenum trioxide powder were photographed with a transmission electron microscope (TEM). The major axis (the Feret diameter of the longest portion observed) and the minor axis (the short Feret diameter in a direction perpendicular to the Feret diameter of the longest portion) of the minimum unit particles (that is, primary particles) constituting aggregates on a two-dimensional image were measured, and an average value thereof was defined as the primary particle diameter. The same operation was performed on 50 primary particles randomly selected, and the average particle diameter of the primary particles was calculated based on the average value of the primary particle diameters of these primary particles.

[Purity Measurement of Molybdenum Trioxide: XRF Analysis]

About 70 mg of a sample of collected molybdenum trioxide particles was taken on a filter paper and covered with a PP film to perform composition analysis using a fluorescent X-ray analyzer Primus IV (manufactured by Rigaku Corporation). The amount of molybdenum determined based on an XRF analysis result was determined in terms of molybdenum trioxide (% by mass) with respect to 100% by mass of the molybdenum trioxide particles.

[Measurement of Specific Surface Area: BET Method]

A sample of the molybdenum trioxide particles or molybdenum sulfide powder particles was measured with a specific surface area meter (BELSORP-mini manufactured by MicrotracBEL Corp.), and the surface area per gram of the sample measured based on the amount of the adsorbed nitrogen gas by the BET method was calculated as the specific surface area ($m^2/g$).

[Identification and Analysis of Crystal Structures (1)]

Figure 2:
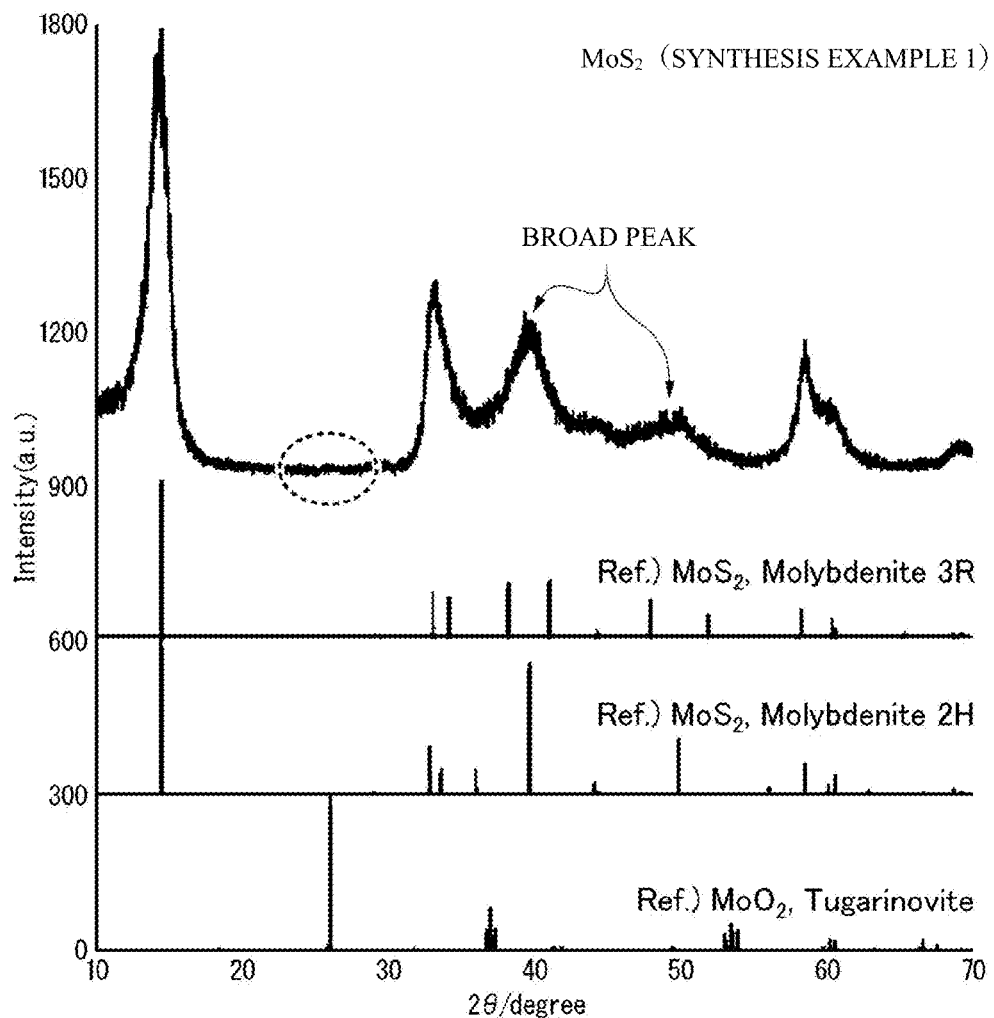
FIG. 2 is a graph showing a result of an X-ray diffraction (XRD) profile of a molybdenum sulfide powder obtained in Synthesis Example 1 together with a diffraction profile of a 3R crystal structure of molybdenum disulfide ($MoS_2$), a diffraction profile of a 2H crystal structure of molybdenum disulfide ($MoS_2$), and a diffraction profile of molybdenum dioxide ($MoO_2$).
Figure 4:
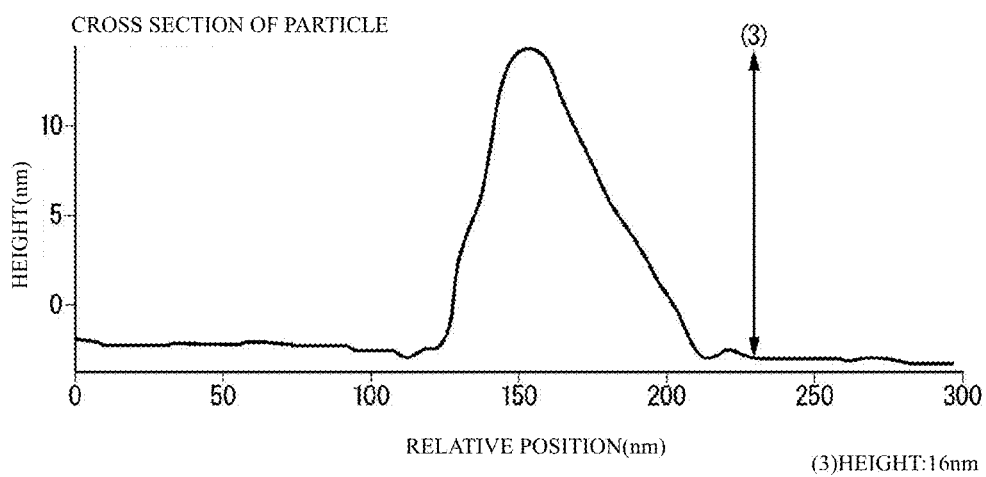
FIG. 4 is a graph showing a cross section of the molybdenum disulfide particle shown in FIG. 3.
Figure 6:
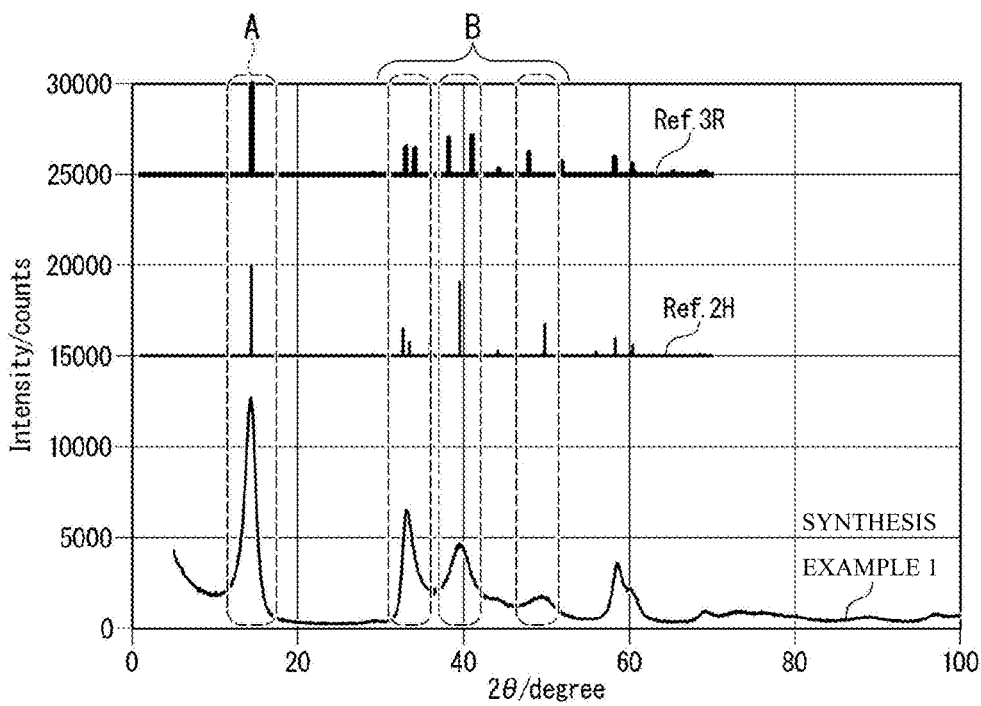
FIG. 6 is a graph showing an X ray diffraction (XRD) profile of the molybdenum disulfide particles in Synthesis Example 1 and reference peaks of the 2H crystal structure and the 3R crystal structure of molybdenum disulfide.
Figure 7:
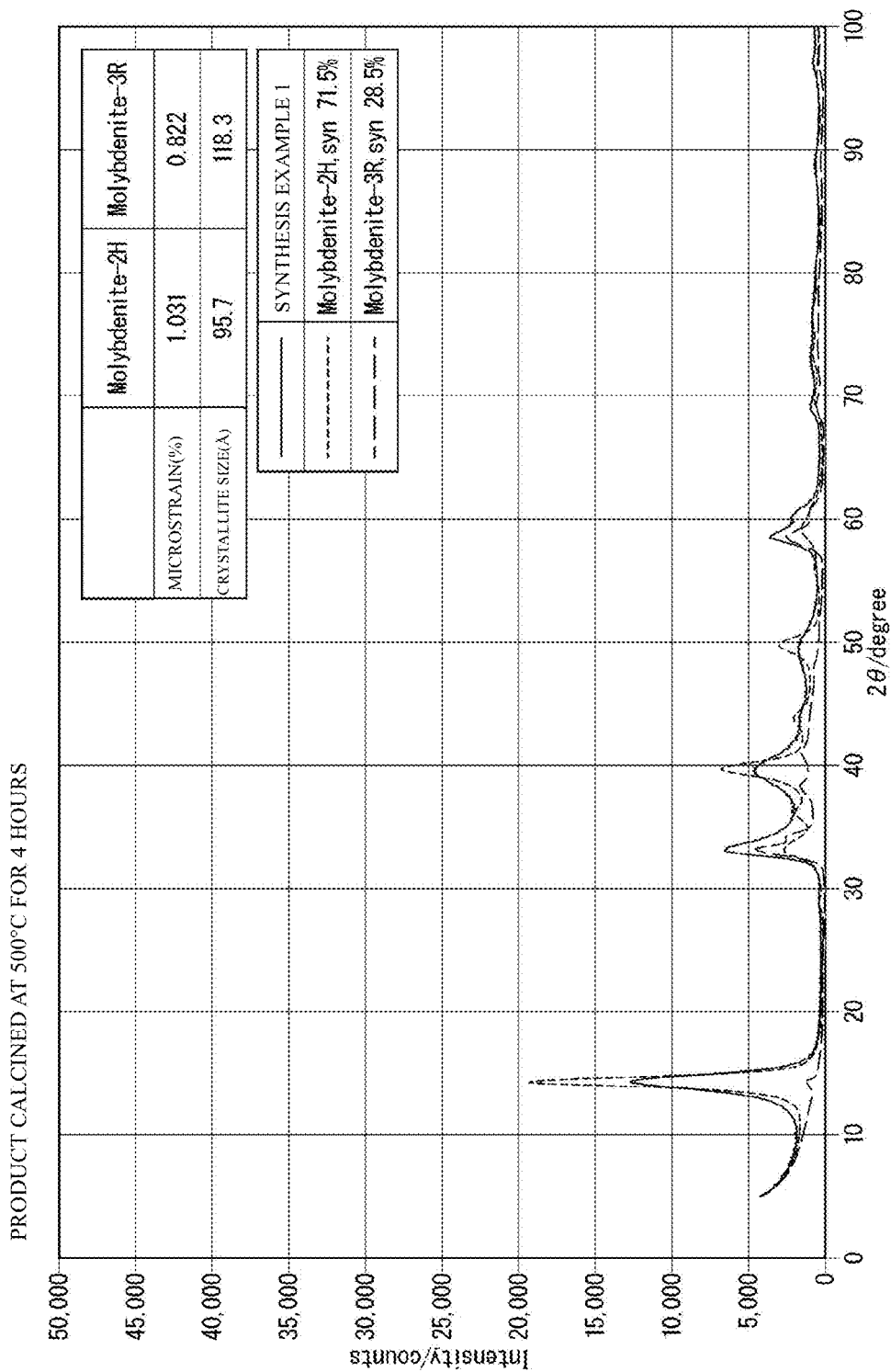
FIG. 7 is a graph showing results of calculating a ratio of the 2H crystal structure and the 3R crystal structure and crystallite sizes obtained by Rietveld analysis from X ray diffraction (XRD) profiles of the molybdenum disulfide particles in Synthesis Example 1.
Figure 8:
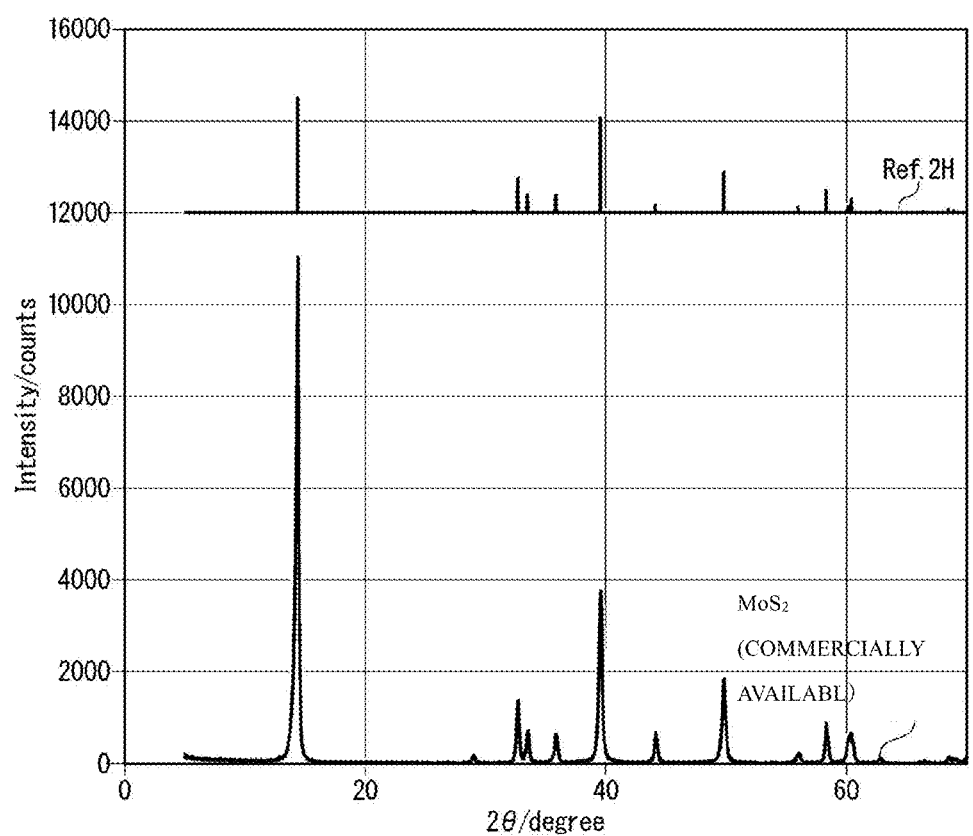
FIG. 8 is a graph showing a result of an X-ray diffraction (XRD) profile of a molybdenum sulfide powder according to Comparative Example 1 together with the diffraction profile of the 2H crystal structure of molybdenum disulfide ($MoS_2$).

A sample of the molybdenum disulfide particles was filled in a holder for a measurement sample having a depth of 0.5 mm, and the holder was set in a wide-angle X-ray diffraction (XRD) apparatus (Ultima IV manufactured by Rigaku Corporation; as an optical system, a parallel beam method and a scintillation counter detector were used on the incident side and a rotating stage was used), and the sample was subjected to measurement under conditions of Cu/Kα rays, 40 kV/40 mA, a scanning speed of 2°/min, a step of 0.02°, and a scanning range of 5° or more and 70° or less (FIG. 2, FIG. 4, and FIG. 6). XRD profile depiction and comparison with reference peaks were performed using XRD profile analysis software (PDXL Version 2) manufactured by Rigaku Corporation.

[Identification and Analysis of Crystal Structures (2)]

Figure 5:
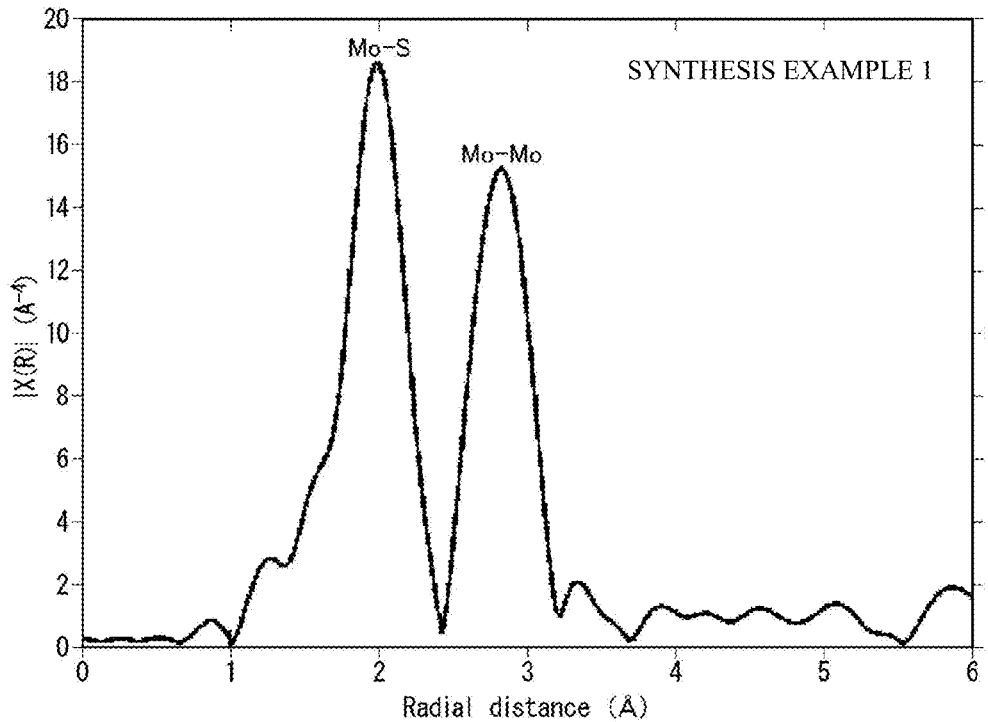
FIG. 5 is a graph showing an extended X-ray absorption fine structure (EXAFS) profile of a K absorption edge of molybdenum measured using molybdenum sulfide powder obtained in Synthesis Example 1.

A sample of the molybdenum disulfide particles was filled into a sample holder for measurement made of SUS with the measurement surface being smooth so that the thickness was 2.4 mm and the inner diameter was 27 mm, and the filled holder was set in a multipurpose X-ray diffraction (XRD) system (Empyrean3, manufacture by Malvern Panalytical Ltd.). Measurement was performed using a monochromator on the incident side and a semiconductor high-speed detector (1D mode) under 45 kV/40 mA with CuKα rays, and using a rotating stage under conditions of a measurement time of 8 minutes (Examples 1 and 2), a step size of 0.066 degrees (Examples 1 and 2), and a scanning range of 5 degrees or more and 100 degrees or less by a concentration method to give a diffraction profile (FIG. 5).

Rietveld analysis including crystallite size evaluation was performed using software (High Score Plus, manufactured by Malvern Panalytical Ltd.).

Calculation of the degree of crystallinity of the molybdenum disulfide particles was performed by (1) determining a boundary line between the background A derived from the device and the obtained diffraction profile in the range of 10° to 95°, and subtracting the background A from the obtained diffraction profile, (2) determining a broad peak B called amorphous halo derived from an amorphous phase in the range of 10° to 95°, and further subtracting the background B from the obtained diffraction profile, and (3) dividing the sum of the peak intensities derived from the crystals above the background A and the amorphous halo B by the sum of the intensities in the XRD profile excluding the background A. The maximum value of the degree of crystallinity is 99.95%, representing a state where all of the molybdenum disulfide particles are crystallized.

The presence ratio of the 2H crystal structure and the 3R crystal structure in the molybdenum disulfide particles was determined, specifically in Example 1, by determining the crystallite size and the presence ratio of the 2H crystal structure by the broad peaks in the vicinity of 40° and in the vicinity of 50°, and determining the difference by performing operation of reproducing the overall actually measured XRD profile by optimizing the 3R crystal structure parameters with two peaks in the vicinity of 33° and two peaks in the vicinity of 40°.

[Basic Formula and Calculation for Crystallite Size Evaluation]

The diffraction profiles were used to determine the crystallite sizes of the 2H crystal structure and the 3R crystal structure on the basis of an analytical formula L=Kλ/β cos θ. In the above formula, K is an instrumental constant that depends on the XRD optical system (incident side and detector side) and settings, L is the crystallite size [m], λ is a measured X-ray wavelength [m], β is a half width [rad], and θ is the Bragg angle of the diffraction line [rad].

[Conversion Ratio $R_c$ to $MoS_2$]

By a RIR (reference intensity ratio) method, the conversion ratio $R_c$ to $MoS_2$ was determined according to the following equation (1) using the RIR value $K_A$ of molybdenum sulfide ($MoS_2$), the integrated intensity $I_A$ of the peak in the vicinity of 2θ=14.4°±0.5° attributed to the plane (002) or the plane (003) of molybdenum sulfide ($MoS_2$), the RIR value $K_B$ of each molybdenum oxide ($MoO_3$ as a raw material, and $Mo_9O_{25}$, $Mo_4O_{11}$, $MoO_2$, etc. as reaction intermediates), and the integrated intensity $I_B$ of the strongest line peak of each molybdenum oxide ($MoO_3$ as a raw material, and $Mo_9O_{25}$, $Mo_4O_{11}$, $MoO_2$, etc. as reaction intermediates).

$$R_c(\%)=(I_A/K_A)/(\Sigma(I_B/K_B))\times100 \quad (1)$$

Here, each value described in the inorganic crystal structure database (ICSD) was used as the RIR value, and integrated X-ray powder diffraction software (PDXL2) (Rigaku Corporation) was used for analysis.

[Measurement of Extended X-Ray Absorption Fine Structure (EXAFS)]

In a mortar, 36.45 mg of a molybdenum sulfide powder and 333.0 mg of boron nitride were mixed. 123.15 mg of the mixture was weighed and compression molded into a tablet having a diameter of 8 mm to obtain a measurement sample. Using this measurement sample, the extended X-ray absorption fine structure (EXAFS) was measured by a transmission method with BL5S1 of Aichi Synchrotron Radiation Center. Athena (Internet <URL: https://bruceravel.github.io/demeter/>) was used for analysis.

[Measurement of Median Diameter $D_{50}$ of Molybdenum Disulfide Particles Constituting Molybdenum Sulfide Powder]

0.1 g of the molybdenum sulfide powder was added to 20 cc of acetone and the resultant mixture was subjected to ultrasonic treatment in an ice bath for 4 hours. Then, the concentration thereof was appropriately adjusted with acetone to a concentration within a measurable range of a dynamic light scattering-type particle diameter distribution analyzer (Nanotrac Wave II manufactured by MicrotracBEL Corp.) to give a measurement sample. Using this measurement sample, the particle diameter distribution in the range of a particle diameter in the range of 0.0001 μm to 10 μm was measured with a dynamic light scattering-type particle diameter distribution analyzer to calculate the median diameter $D_{50}$.

[Method for Observing Particle Shape of Molybdenum Disulfide Particles]

The molybdenum disulfide particles were measured with an atomic force microscope (AFM) (Cypher-ES manufactured by Oxford Instruments Asylum Research Inc.) to observe the particle shape.

Synthesis Example 1

(Production of Molybdenum Trioxide Particles)

1.5 kg of aluminum hydroxide (manufactured by Nippon Light Metal Co., Ltd.) and 1 kg of molybdenum trioxide (manufactured by NIPPON MUKI CO., LTD.) were mixed, and then the resultant mixture was charged in a saggar and calcined at 1,100° C. for 10 hours with the calcining furnace 2 in the production apparatus 1 shown in FIG. 1. During the calcining, outside air (blowing speed: 50 L/min, outside air temperature: 25° C.) was introduced from a side surface and a lower surface of the calcining furnace 2. Molybdenum trioxide was evaporated in the calcining furnace 2, then cooled in the vicinity of the collection device 4, and precipitated as particles. An RHK simulator (manufactured by NORITAKE CO., LIMITED) was used as the calcining furnace 2, and a VF-5N dust collector (manufactured by AMANO Corporation) was used as the collection device 4.

After calcining, 1.0 kg of aluminum oxide, a blue powder, and 0.85 kg of the molybdenum trioxide particles collected by the collection device 4 were taken out from the sagger. The collected molybdenum trioxide particles had an average particle diameter of primary particles of 80 nm, and by X-ray fluorescence (XRF) measurement, it was found that the purity of molybdenum trioxide was 99.7%. The specific surface area (SA) of the molybdenum trioxide particles measured by a BET method was 44.0 m²/g.

(Production of Molybdenum Disulfide Powder)

Into a porcelain crucible, 40.0 g (277.9 mmol) of molybdenum trioxide particles collected by the collection device 4 and 40.0 g (1,250 mmol) of sulfur powder (manufactured by KANTO CHEMICAL CO., INC.) were placed and mixed with a stirring rod so as to prepare a uniform powder. The porcelain crucible was placed in a high-temperature atmosphere calcining furnace (SKM-2030P-OP, manufactured by MOTOYAMA CO., LTD.). Inside of the furnace was vacuumed and then purged with nitrogen. Then, calcining was performed at 500° C. for 4 hours to give a black powder. Here, the S amount in the sulfur was 450 mol % with respect to the $MoO_3$ amount of 100 mol % in the molybdenum trioxide particles. FIG. 2 shows a result of an X-ray diffraction (XRD) profile of the black power (molybdenum disulfide powder used in Example 1) together with the diffraction profile of the 3R crystal structure of molybdenum disulfide (MoS$_2$), the diffraction profile of the 2H crystal structure of molybdenum disulfide (MoS$_2$), and the diffraction profile of molybdenum dioxide (MoO$_2$) which are shown in the inorganic crystal structure database (ICSD). Molybdenum dioxide (MoO$_2$) is a reaction intermediate.

The specific surface area of the molybdenum disulfide powder in Synthesis Example 1 was measured by the BET method and was found to be 49.6 m$^2$/g. The bulk density was measured using a bulk density measuring instrument (manufactured by Ito MFG Co. Ltd., compliant with JIS-K-5101) and an electromagnetic balance (GX-4000R, manufactured by A&D Company, Limited) and was found to be 0.283 g/cm$^3$.

The particle size distribution of the molybdenum disulfide particles produced in Synthesis Example 1 was measured by a dynamic light scattering-type particle diameter distribution analyzer to obtain the median diameter D$_{50}$, which was found to be 250 nm.

Figure 3:
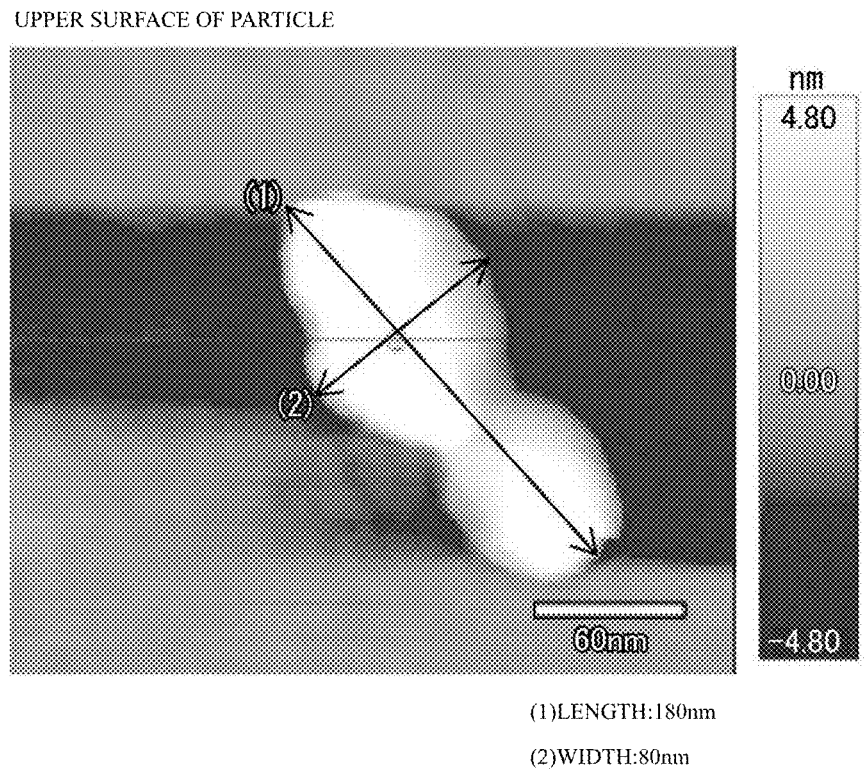
FIG. 3 is an AFM image of a synthesized molybdenum disulfide particle.

FIG. 3 shows an AFM image of the synthesized molybdenum disulfide particles. FIG. 3 is the AFM image obtained after the measurement and shows the upper surface of a molybdenum disulfide particle. A length (longitudinal)×a width (transverse) was determined from this AFM image and was found to be 180 nm×80 nm. FIG. 4 is a graph showing the cross-section of the molybdenum disulfide particle shown in FIG. 3. A thickness (height) was determined from this cross-sectional view and was found to be 16 nm. Therefore, the value of the aspect ratio (length (vertical)/thickness (height)) of the primary particles of the molybdenum disulfide particles was 11.25.

The average value of 50 molybdenum disulfide particles including the molybdenum disulfide particle shown in FIG. 3 was Length (longitudinal)×Width (transverse)×Thickness (height)=198 nm×158 nm×19 nm.

A representative example of the AFM measurement results of the molybdenum disulfide particles is shown in Table 1. In Table 1, "Molybdenum disulfide particle (1)" is the molybdenum disulfide particle shown in FIG. 3. "Molybdenum disulfide particle (2)" is the molybdenum disulfide particle having the longest length and "Molybdenum disulfide particle (3)" is the particle having the shortest length in the measured molybdenum disulfide particles. "Molybdenum disulfide particle (4)" has relatively thick thickness, and "Molybdenum disulfide particle (5)" has the thinnest thickness. "Molybdenum disulfide particle (6)" is the particle having the largest aspect ratio. "Molybdenum disulfide particle (7)" is the particle having the thickest thickness and having the smallest aspect ratio.

TABLE 1

| | Particle shape | Length (longitudinal) [nm] | Width (transverse) [nm] | Thickness (height) [nm] | Aspect ratio [—] |
|---|---|---|---|---|---|
| Molybdenum disulfide particles (1) | Ribbon | 180 | 80 | 16 | 11.25 |
| Molybdenum disulfide particles (2) | Disk | 500 | 400 | 13 | 38.46 |
| Molybdenum disulfide particles (3) | Sheet | 60 | 60 | 5 | 12 |
| Molybdenum disulfide particles (4) | Disk | 180 | 130 | 40 | 4.5 |
| Molybdenum disulfide particles (5) | Sheet | 80 | 80 | 3 | 26.67 |
| Molybdenum disulfide particles (6) | Sheet | 320 | 300 | 4 | 80 |
| Molybdenum disulfide particles (7) | Disk | 200 | 150 | 70 | 2.86 |

The extended X-ray absorption fine structure (EXAFS) of the molybdenum disulfide powder produced in Synthesis Example 1 was measured. FIG. 3 shows an extended X-ray absorption fine structure (EXAFS) profile of a K absorption edge of molybdenum. In a radial distribution function obtained from the profile, the ratio (I/II) of the peak intensity I caused by Mo—S to the peak intensity II caused by Mo—Mo was 1.26.

First, a part of the X-ray diffraction (XRD) profile of the molybdenum disulfide particles obtained in Synthesis Example 1 is shown in FIG. 4. As shown in FIG. 4, the main peak (A in FIG. 4) of the molybdenum disulfide particles in Synthesis Examples 1 coincided in the vicinity of 2θ:14° and the main peaks of the 3R crystal structure and the 2H crystal structure as the references also coincided. On the other hand, the broad peaks in the vicinity of 2θ:32.5°, in the vicinity of 2θ:39.5°, and in the vicinity of 2θ:49.5° (B in FIG. 5) almost coincided with the positions of the peaks of the 3R crystal structure and the 2H crystal structure serving as the references. The peaks in the vicinity of 2θ:39.5° and in the vicinity of 2θ:49.5° were the synthesized waves of the peaks derived from the 3R crystal structure and the 2H crystal structure, respectively, revealing that both of the 3R crystal structure and the 2H crystal structure were included.

Therefore, it was found from the result of FIG. 5 that when Rietveld analysis of each diffraction profile in Synthesis Example 1 was performed, two kinds of crystal structures of the 3R crystal structure and the 2H crystal structure were present. As a result of calculating the presence ratio of each crystal structure, in Example 1, the presence ratio of the 2H crystal structure in the crystal phase was 71.5% and the presence ratio of the 3R crystal structure was 28.5%. The crystallite size of the 2H crystal structure (crystal phase) was evaluated to be 9.6 nm and the crystallite size of the 3R crystal structure (crystal phase) was evaluated to be 11.8 nm.

(Production of Particle-Containing Grease Compositions)

Example 1

To 11.3 parts by mass of a grease composition using diester and synthetic hydrocarbon oil as base oil and Li soap as a thickener (Multemp PS No. 2 manufactured by Kyodo Yushi, Co., Ltd.), 3 parts by mass of the obtained molybdenum disulfide powder (molybdenum disulfide particles) was added and mixed to prepare a particle-containing grease composition precursor containing 21% by mass of molybdenum disulfide. This particle-containing grease composition precursor was kneaded three times with a Hoover muller (manufactured by TOYO SEIKI SEISAKU-SHO, LTD.) at a load of 6 kgf and a rotation speed of 30 rpm. To 14.3 parts by weight of this kneaded particle-containing grease composition precursor, 85.7 parts by weight of the grease composition (Multemp PS No. 2, manufactured by Kyodo Yushi Co., Ltd.) was added and mixed uniformly. Finally, the mixture was kneaded with a planetary centrifugal mixer (Thinky Mixer manufactured by THINKY CORPORATION) at a rotation speed of 2,000 rpm for 30 seconds to give a particle-containing grease composition containing 3% by mass of molybdenum disulfide in Example 1.

Example 2

A particle-containing grease composition containing 0.3% by weight of molybdenum disulfide was obtained by the same manner as in Example 1 except that 98.57 parts by weight of the grease composition (Multemp PS No. 2 manufactured by Kyodo Yushi Co., Ltd.) was acted on 1.43 parts by weight of the particle-containing grease composition precursor containing 21% by mass of molybdenum disulfide after kneading with the Hoover muller in Example 1.

(Commercially Available Molybdenum Disulfide Particles)

The result of the X-ray diffraction profile of a commercially available molybdenum disulfide powder (M-5 powder manufactured by NICHIMOLY DIVISION in DAIZO CORPORATION) is shown in FIG. 6 together with the diffraction profile of molybdenum disulfide having the 2H crystal structure. It was found that this commercially available molybdenum disulfide reagent was molybdenum disulfide having the presence ratio of the 2H crystal structure of 99% or more. Half widths of the peak in the vicinity of 39.5° and the peak in the vicinity of 49.5° were 0.230 and 0.22°, respectively, which were narrower than those of Synthesis Example 1.

For the commercially available molybdenum disulfide powder, the ratio (I/II) of the peak intensity I caused by Mo—S to the peak intensity II caused by Mo—Mo obtained based on the measurement of the extended X-ray absorption fine structure (EXAFS) of the K absorption edge of molybdenum and the specific surface area (SA) was 0.72. The specific surface area of the commercially available molybdenum disulfide powder was measured by the BET method and was found to be 9.1 m²/g.

The particle size distribution of the commercially available molybdenum disulfide powder was measured with a dynamic light scattering-type particle diameter distribution analyzer to obtain the median diameter $D_{50}$, which was found to be 602 nm.

(Production of Particle-Containing Grease Compositions)

Comparative Example 1

A particle-containing grease composition of Comparative Example 1 containing 3% by mass of molybdenum disulfide was obtained by the same manner as in Example 1 except that the commercially available molybdenum disulfide powder (molybdenum disulfide particles) was used.

Comparative Example 2

A particle-containing grease composition of Comparative Example 2 containing 0.3% by mass of molybdenum disulfide was obtained in the same manner as in Example 2 except that the commercially available molybdenum disulfide powder (molybdenum disulfide particles) was used.

Comparative Example 3

As Comparative Example 3, a grease composition (Multemp PS No. 2 manufactured by Kyodo Yushi Co., Ltd.) containing no molybdenum disulfide powder (molybdenum disulfide particles) was prepared.

[Friction and Wear Evaluation 1]

A friction and wear test (in accordance with ASTM D2266, load: 40 kgf, rotation speed: 1,200 rpm, test time: 1 hour, and starting temperature: 20° C.) was performed for Examples 1 and 2 and Comparative Examples 1 to 3 using a high-speed four-ball EP tester to measure a wear mark diameter, a maximum load without seizure, and a fusion load.

Three SUJ2 special stainless steel balls were fixed and uniformly coated with 2 g of the obtained particle-containing grease composition. One ½-inch SUJ2 special stainless steel ball was rotated with a prescribed load from above in a vertical direction while torque was being applied. The rotation speed of this SUJ2 ball was set to 1,200 rpm and the load was set to 40 kgf. After 1 hour, the diameters (mm) of the wear marks of the fixed SUJ2 balls were recorded.

In accordance with ASTM D2596, each of the load (kgf) immediately before seizure generation of the ½-inch SUJ2 ball and the load (kgf) at which fusion occurred was recorded by setting the rotation speed of the SUJ2 ball to 1,770 rpm and the rotation time to 10 seconds. Results are shown in Table 2.

TABLE 2

| | | Example 1 | Comparative Example 1 | Example 2 | Comparative Example 2 | Comparative Example 3 |
|---|---|---|---|---|---|---|
| Added amount | (%) | 3 | 3 | 0.3 | 0.3 | 0 |
| Wear mark diameter (40 kgf, 1,200 rmp, started at rt, 1 hour) | (mm) | 0.55 | 0.59 | 0.61 | 0.68 | 0.68 |
| | (mm) | 0.60 | 0.66 | 0.66 | 0.67 | 0.65 |
| Wear mark diameter | (mm) | 0.58 | 0.63 | 0.64 | 0.68 | 0.67 |
| Maximum load without seizure (1,770 rpm, 10 s) | (kgf) | 100 | 80 | 63 | 63 | 63 |
| Fusion load (1,770 rpm, 10 s) | (kgf) | 350 | 225 | 225 | 200 | 170 |

As a result, it was found that in Example 1, the average value of the wear mark diameter was 0.58 mm, and thus the wear mark diameter was small and the friction surface was less likely to be scraped. It was found that the maximum load without seizure was 100 kgf, and thus even when the load was increased, the friction surfaces did not easily change in quality and seizure was difficult to occur. It was found that the fusion load was 350 kgf, and thus even when the load was increased, the friction surfaces was not easily heated and the metal balls were difficult to fuse with each other.

On the other hand, it was found that in Comparative Example 1, the average wear mark diameter was 0.63 mm, and thus the wear mark diameter was larger than that in Example 1 and the friction surface was easily scraped. The maximum load without seizure was 80 kgf and the fusion load was 225 kgf. Compared to Example 1, the loads at which the seizure and the fusion occurred were smaller, resulting in inferior friction and wear properties.

It was found that in Example 2, the average wear mark diameter was 0.64 mm, and thus the wear mark diameter was small and the friction surface was less likely to be scraped. It was found that the maximum load without seizure was 63 kgf, and thus even when the load was increased, the friction surfaces did not easily change and seizure was difficult to occur. It was found that the fusion load was 225 kgf, and thus even when the load was increased, the friction surfaces was not easily heated and the metal balls did not fuse with each other.

On the other hand, it was found that in Comparative Example 2, the average wear mark diameter was 0.68 mm, and thus the wear mark diameter was larger than that in Example 2 and the friction surface was easily scraped. The maximum load without seizure was 63 kgf and the fusion load was 200 kgf. Compared to Example 2, the loads at which the seizure and the fusion occurred were smaller, resulting in inferior friction and wear properties.

It was found that in Comparative Example 3, the average wear mark diameter was 0.67 mm, and thus the friction mark diameter was larger than that in Example 1 and the friction surface was easily scraped. The maximum load without seizure was 63 kgf and the fusion load was 170 kgf. Compared to Examples 1 and 2, the loads at which the seizure and the fusion occurred were smaller, resulting in inferior friction and wear properties.

The differences in friction and wear performance between Example 1 and Comparative Example 1, as well as between Example 2 and Comparative Example 2, are considered here. The molybdenum disulfide powders used in Example 1 and Example 2 are molybdenum disulfide containing the 2H crystal structure and the 3R crystal structure. The specific surface area measured by the BET method is 49.6 m$^2$/g, and the median diameter $D_{50}$ measured by the dynamic light scattering-type particle diameter distribution analyzer is 250 nm. On the other hand, the commercially available molybdenum disulfide powder used in Comparative Example 1 and Comparative Example 2 is molybdenum disulfide having a 2H crystal structure of 99% or more. The specific surface area measured by the BET method is 9.1 m$^2$/g, and the median diameter $D_{50}$ measured by the dynamic light scattering-type particle diameter distribution analyzer is 602 nm. It is considered that the reason why the friction and wear properties of Example 1 are superior to those of Comparative Example 1 and friction and wear properties of Example 2 are superior to those of Comparative Example 2 is because, on the premise that the median diameter $D_{50}$ of the molybdenum disulfide powder used in Example 1 and Example 2 is about 250 nm, containing the 2H crystal structure and the 3R crystal structure and having a specific surface area of 49.6 m$^2$/g makes a further contribution. Therefore, for example, it is conceivable that even a molybdenum disulfide powder having a median diameter $D_{50}$ of about 250 nm, a presence ratio of the 2H crystal structure of 99% or more, and a specific surface area of about 9.1 m$^2$/g exhibits relatively excellent friction and wear performance. Similarly, it is conceivable that even a molybdenum disulfide powder having a median diameter $D_{50}$ of about 250 nm, a presence ratio of the 2H crystal structure of 99% or more, and a specific surface area of about 49.6 m$^2$/g exhibits relatively excellent friction and wear performance. Alternatively, it is conceivable that even a molybdenum disulfide powder having a median diameter $D_{50}$ of about 250 nm, containing the 2H crystal structure and the 3R crystal structure, and having a specific surface area of about 9.1 m$^2$/g exhibits relatively excellent friction and wear performance.

[Friction and Wear Evaluation 2]

A friction and wear test (in accordance with ASTM D5707, load: 200 N, amplitude: 1.0 mm, temperature: 80° C., frequency: 50 Hz, and test time: 120 minutes) was performed on Example 1, Comparative Example 1, and Comparative Example 3 with an oscillating friction and wear tester to measure friction coefficients.

Figure 9:
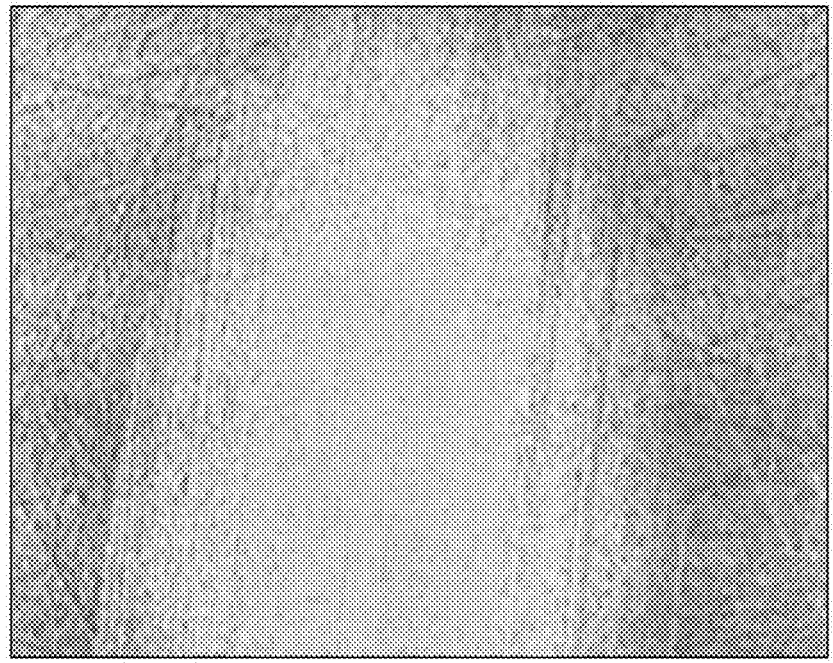
FIG. 9 is a photograph showing the result of observation of a sliding surface with a microscope after performing a friction and wear test with an oscillating friction and wear tester using a particle-containing grease composition of Example 1.
Figure 10:
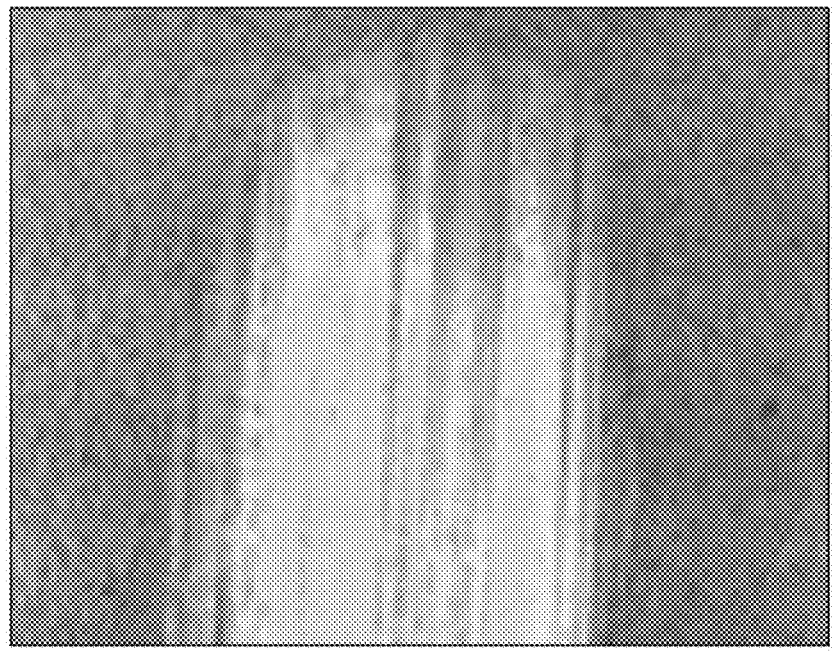
FIG. 10 is a photograph showing the result of observation of a sliding surface with the microscope after performing the friction and wear test with the oscillating friction and wear tester using a particle-containing grease composition of Comparative Example 1.
Figure 11:
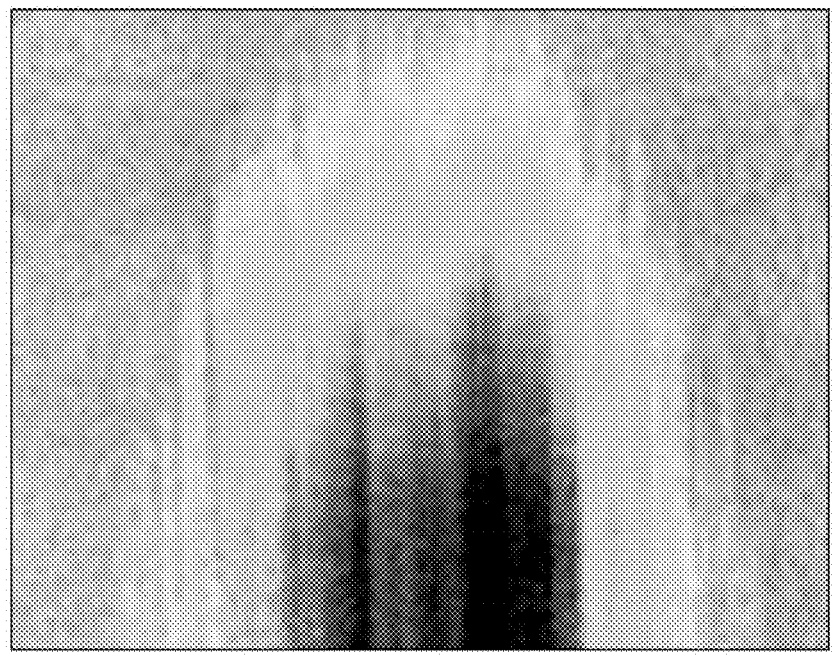
FIG. 11 is a photograph showing the result of observation of a sliding surface using the microscope after performing the friction and wear test with the oscillating friction and wear tester using a grease composition of Comparative Example 3.

A SUJ2 special stainless steel disk and ball were fixed, 10 g of the obtained particle-containing grease composition was uniformly applied, and a specified load was applied in a vertical direction from above of the ball to oscillate the ball at a specified frequency and amplitude. The friction coefficient was measured during 120 minutes (2 hours) of oscillation and the friction coefficient at a point of time of 30 minutes (f30) was recorded. The wear marks generated on the sliding surface after 120 minutes of oscillation were observed with a laser microscope (VK-200 manufactured by KEYENCE CORPORATION), and the depth of the wear marks and the surface roughness of the wear marks were measured. The surface roughness was determined by arithmetic mean roughness (Ra). Results are shown in Table Y. The results of microscope observation of the sliding surfaces are shown in FIGS. 9 to 11.

TABLE 3

|  | f30 [—] | Depth of wear mark [μm] | Surface roughness of wear mark [μm] |
| --- | --- | --- | --- |
| Example 1 | 0.15 | 12.9 | 2.0 |
| Comparative Example 1 | 0.15 | 19.8 | 3.1 |
| Comparative Example 3 | 0.16 | 34.7 | 7.1 |

In Example 1, it was capable of being found that f30 was 0.15 and thus the friction coefficient was excellent. As shown in FIG. 9, it was also capable of being found that the depth of the wear marks was shallow, and the depth and the surface roughness of the wear marks were 12.9 μm and 2.0 μm, respectively, and thus the amount of wear was small and the surface roughness was also small.

On the other hand, in Comparative Example 1, it was found that although f30 was 0.15, which was almost equal to that of Example 1, the depth of the wear marks was deep as shown in FIG. 10, and the depth and the surface roughness of the wear marks were 19.8 μm and 3.1 μm, respectively, and thus the amount of wear was large and the surface roughness was also large compared with those in Example 1. Therefore, the wear resistance properties were inferior to those of Example 1.

In Comparative Example 3, f30 was 0.16 and thus friction coefficient was inferior to that of Example 1. Furthermore, as shown in FIG. 11, the depth of the wear marks was further deeper, and the depth and the surface roughness of the wear marks were 34.7 μm and 7.1 μm, respectively, and thus wear resistance properties were significantly inferior to those of Example 1.

INDUSTRIAL APPLICABILITY

The particle-containing grease composition according to the present invention is suitable for use in sliding parts between metal members, between resin members, or between resin members and metal members, and can be applied to equipment, parts, and the like in various industrial fields. For example, the particle-containing grease composition can be widely applicable to power transmission devices such as decelerators and accelerators, gears, chains, and motors; driving system parts; control system parts such as antilock braking systems (ABS); steering system parts; drive system parts such as transmissions; additional automotive parts such as power window motors, power seat motors, and sunroof motors; components for office equipment such as copiers and printers; hinge parts for electronic information equipment and mobile phones; various parts in the food and pharmaceutical industries, steel industries, construction industries, glass industries, cement industries, film tenters, chemical, rubber, and resin industries, environmental and power equipment, paper and printing industries, wood industries, textile and apparel industries; and mechanical parts in relative motion. In particular, particle-containing grease composition can be suitably used for transmission elements that may generate high loads. The particle-containing grease composition according to the present invention is also applicable to bearings such as rolling bearings, thrust bearings, hydrodynamic bearings, plastic bearings, and linear motion devices.

REFERENCE SIGNS LIST

1: Production apparatus
2: Calcining furnace
3: Cooling pipe
4: Collection device
5: Discharge port
6: Opening degree adjustment damper
7: Observation window
8: Air exhauster
9: External cooling device

The invention claimed is:

1. A particle-containing grease composition comprising:
   base oil;
   a thickener; and
   molybdenum disulfide particles,
   wherein the molybdenum disulfide particles are sulfide made of molybdenum trioxide particles made of aggregates of primary particles containing a β crystal structure,
   a median diameter $D_{50}$ of the molybdenum disulfide particles determined by a dynamic light scattering method is 10 nm or more and less than 450 nm,
   a shape of primary particles of the molybdenum disulfide particles is a disk shape, a ribbon shape, or a sheet shape, and a thickness is in a range of 3 nm to 100 nm,
   a specific surface area of the molybdenum disulfide particles is 10 $m^2/g$ or more measured by a BET method, and
   a bulk density of the molybdenum disulfide particles is 0.1 $g/cm^3$ or more and 1.0 $g/cm^3$ or less.

2. The particle-containing grease composition according to claim 1, wherein the molybdenum disulfide particles have a 2H crystal structure and a 3R crystal structure of molybdenum disulfide.

3. The particle-containing grease composition according to claim 1, wherein in a radial distribution function of the molybdenum disulfide particles obtained from an extended X-ray absorption fine structure (EXAFS) profile of a K absorption edge of molybdenum, a ratio (I/II) of peak intensity I caused by Mo—S to peak intensity II caused by Mo—Mo is larger than 1.0.

4. The particle-containing grease composition according to claim 1, wherein
   the molybdenum disulfide particles have a 2H crystal structure and a 3R crystal structure of molybdenum disulfide,
   in a profile of the molybdenum disulfide particles obtained from powder X-ray diffraction (XRD) using Cu-Kα rays as an X-ray source, a peak in the vicinity of 39.5° and a peak in the vicinity of 49.5° are derived from the 2H crystal structure, and a peak in the vicinity of 32.5°, a peak in the vicinity of 39.5°, and a peak in the vicinity of 49.5° are derived from the 3R crystal structure, and
   half widths of the peak in the vicinity of 39.5° and the peak in the vicinity of 49.5° are 1° or more.

5. The particle-containing grease composition according to claim 4, wherein a crystallite size of the 3R crystal structure calculated by extended-type Rietveld analysis based on an analytical formula $L=K\lambda/(\beta \cos \theta)$ using a profile obtained from powder X-ray diffraction (XRD) using Cu-Kα rays as an X-ray source is 1 nm or more and 150 nm or less,
   wherein in the above formula, L is a crystallite size [m], K is an instrumental constant that depends on an XRD optical system (an incident side and a detector side) and settings, λ is a measured X-ray wavelength [m], β is a half width [rad], and θ is a Bragg angle of a diffraction line [rad].

6. The particle-containing grease composition according to claim 4, wherein a presence ratio of the 2H crystal structure and the 3R crystal structure obtained by extended-type Rietveld analysis using the profile obtained from the XRD is 10:90 to 90:10.

7. The particle-containing grease composition according to claim 1, wherein the molybdenum disulfide particles are contained in a ratio of 0.0001% by mass or more and 10% by mass or less with respect to 100% by mass of a total mass of the particle-containing grease composition.

* * * * *